United States Patent
Nagura

(10) Patent No.: US 9,778,035 B2
(45) Date of Patent: Oct. 3, 2017

(54) SCALE, ENCODER, LENS APPARATUS, AND IMAGE PICKUP SYSTEM HAVING A PLURALITY OF PATTERNS WITH DIFFERENT MODULATING PERIODS

(71) Applicant: CANON KABUSHIKI KAISHA, Tokyo (JP)

(72) Inventor: Chihiro Nagura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 301 days.

(21) Appl. No.: 14/014,483

(22) Filed: Aug. 30, 2013

(65) Prior Publication Data

US 2014/0064565 A1 Mar. 6, 2014

(30) Foreign Application Priority Data

Aug. 31, 2012 (JP) .................................. 2012-190833

(51) Int. Cl.
*G01D 5/347* (2006.01)
*G01C 11/06* (2006.01)

(52) U.S. Cl.
CPC ......... *G01C 11/06* (2013.01); *G01D 5/34707* (2013.01)

(58) Field of Classification Search
CPC ............................ G01C 11/06; G01D 5/34707
USPC ....... 250/221, 231.13–231.18; 356/138, 139, 356/139.03–139.09, 614–624; 359/436–442; 341/13, 14; 33/1 R, 1 N, 33/1 M, 1 L, 1 SP, 1 PT
See application file for complete search history.

(56) References Cited

U.S. PATENT DOCUMENTS

| | | | |
|---|---|---|---|
| 3,768,094 A | | 10/1973 | Henrich |
| 4,384,204 A | * | 5/1983 | Tamaki ................. H03M 1/308 250/231.18 |
| 4,443,788 A | | 4/1984 | Breslow |
| 6,963,409 B2 | | 11/2005 | Benner et al. |
| 7,368,705 B2 | * | 5/2008 | Hare et al. ............... 250/231.13 |

(Continued)

FOREIGN PATENT DOCUMENTS

| | | |
|---|---|---|
| CN | 1646883 A | 7/2005 |
| CN | 1977146 A | 6/2007 |

(Continued)

OTHER PUBLICATIONS

Office Action issued in Japanese Appln. No. 2012-190833 mailed May 17, 2016.

(Continued)

*Primary Examiner* — Francis M Legasse, Jr.
(74) *Attorney, Agent, or Firm* — Rossi, Kimms & McDowell LLP

(57) ABSTRACT

A scale (20) has a plurality of patterns so as to spatially modulate an energy distribution, and the scale includes a first pattern having a first modulation period in a moving direction, and a second pattern having a second modulation period different from the first modulation period in the moving direction, a relative phase between the first pattern and the second pattern changes in accordance with a direction perpendicular to the moving direction, each of the first pattern and the second pattern is configured by including a reflective portion (26) that reflects light and a non-reflective portion (25) that does not reflect the light, and a width of the reflective portion (26) in the moving direction at a first position is different from the width at a second position different from the first position along the direction perpendicular to the moving direction.

24 Claims, 17 Drawing Sheets

(56) References Cited

U.S. PATENT DOCUMENTS

| | | | |
|---|---|---|---|
| 7,589,314 B2 | 9/2009 | Oka et al. | |
| 7,608,813 B1 | 10/2009 | Milvich et al. | |
| 8,094,323 B2* | 1/2012 | Kapner | 356/616 |
| 8,735,801 B2 | 5/2014 | Nagura | |
| 9,127,967 B2 | 9/2015 | Nagura | |
| 2003/0062470 A1 | 4/2003 | Burgschat et al. | |
| 2012/0018626 A1* | 1/2012 | Nagura | G01D 5/34784 250/232 |
| 2012/0075622 A1* | 3/2012 | Nagura | 356/138 |

FOREIGN PATENT DOCUMENTS

| | | |
|---|---|---|
| CN | 101069067 A | 11/2007 |
| CN | 101738217 A | 6/2010 |
| EP | 2395328 A2 | 12/2011 |
| EP | 2405241 A1 | 1/2012 |
| EP | 2511668 A2 | 10/2012 |
| JP | 2010-122214 A | 6/2010 |
| JP | 2011-237231 A | 11/2011 |
| JP | 2012026765 A | 2/2012 |

OTHER PUBLICATIONS

Notice of Allowance issued in Chinese Appln. No. 201310385873.4 mailed May 6, 2016.
European Search Report issued in European counterpart application No. EP13182133.2, dated Sep. 17, 2015.
Office Action issued in CN201310385873.4, dated Sep. 2, 2015. English translation provided.

* cited by examiner

SCALE, ENCODER, LENS APPARATUS, AND IMAGE PICKUP SYSTEM HAVING A PLURALITY OF PATTERNS WITH DIFFERENT MODULATING PERIODS

BACKGROUND OF THE INVENTION

Field of the Invention

The present invention relates to an encoder and a scale used for the encoder.

Description of the Related Art

Japanese Patent No. 2011-237231 discloses an encoder that is provided with a displacement detection sensor to detect a displacement in a lateral direction orthogonal to a measuring direction (a moving direction) to be able to display a displacement between a scale and a detector. In this configuration, the detector and the scale can be adjusted and fixed to have a predetermined position relation, and therefore appropriate signal characteristics can be obtained.

However, in the encoder disclosed in Japanese Patent Laid-Open No. 2011-237231, the displacement detection sensor, a peripheral circuit to connect an output signal obtained from the displacement detection sensor to a microcomputer (a signal processing circuit), and the like are necessary. Therefore, it is a factor of increasing the size and the cost of the encoder. In addition, a scale region to detect a direction (the lateral direction) perpendicular to the measuring direction (the moving direction) and a scale region to detect the measuring direction are arranged separately from each other. Therefore, due to a position variation such as yawing, a displacement is generated between them and an accuracy of detecting the position is deteriorated.

BRIEF SUMMARY OF THE INVENTION

The present invention provides small-size and low-cost scale and encoder capable of detecting a relative position between the scale and a detector in a direction perpendicular to a moving direction with high accuracy. The present invention also provides a lens apparatus and an image pickup system which use the encoder.

A scale as one aspect of the present invention has a plurality of patterns so as to spatially modulate an energy distribution, the scale includes a first pattern having a first modulation period in a moving direction, and a second pattern having a second modulation period different from the first modulation period in the moving direction, a relative phase between the first pattern and the second pattern changes in accordance with a direction perpendicular to the moving direction, each of the first pattern and the second pattern is configured by including a reflective portion that reflects light and a non-reflective portion that does not reflect the light, and a width of the reflective portion in the moving direction at a first position is different from the width at a second position different from the first position along the direction perpendicular to the moving direction.

An encoder as another aspect of the present invention includes a scale having a plurality of patterns so as to spatially modulate an energy distribution, a detector configured to be relatively movable with respect to the scale and having a plurality of detection elements that detect the energy distribution and that are arrayed in a moving direction, and a signal processor configured to process an output signal of the detector so as to obtain position information, the scale includes a first pattern having a first modulation period in the moving direction and a second pattern having a second modulation period different from the first modulation period in the moving direction, a relative phase between the first pattern and the second pattern changes in accordance with a direction perpendicular to the moving direction, and the signal processor includes a first phase obtaining unit that obtains a first phase based on the first pattern and a second phase obtaining unit that obtains a second phase based on the second pattern, and is configured to obtain a position signal in the direction perpendicular to the moving direction based on the first phase and the second phase.

A lens apparatus as another aspect of the present invention includes a lens capable of displacing in an optical axis direction, and the encoder configured to detect a displacement of the lens.

An image pickup system as another aspect of the present invention includes the lens apparatus, and an image pickup apparatus having an image pickup element configured to perform a photoelectric conversion for an optical image obtained via the lens.

Further features and aspects of the present invention will become apparent from the following description of exemplary embodiments with reference to the attached drawings.

DETAILED DESCRIPTION OF THE PREFERRED EMBODIMENTS

Figure 1:
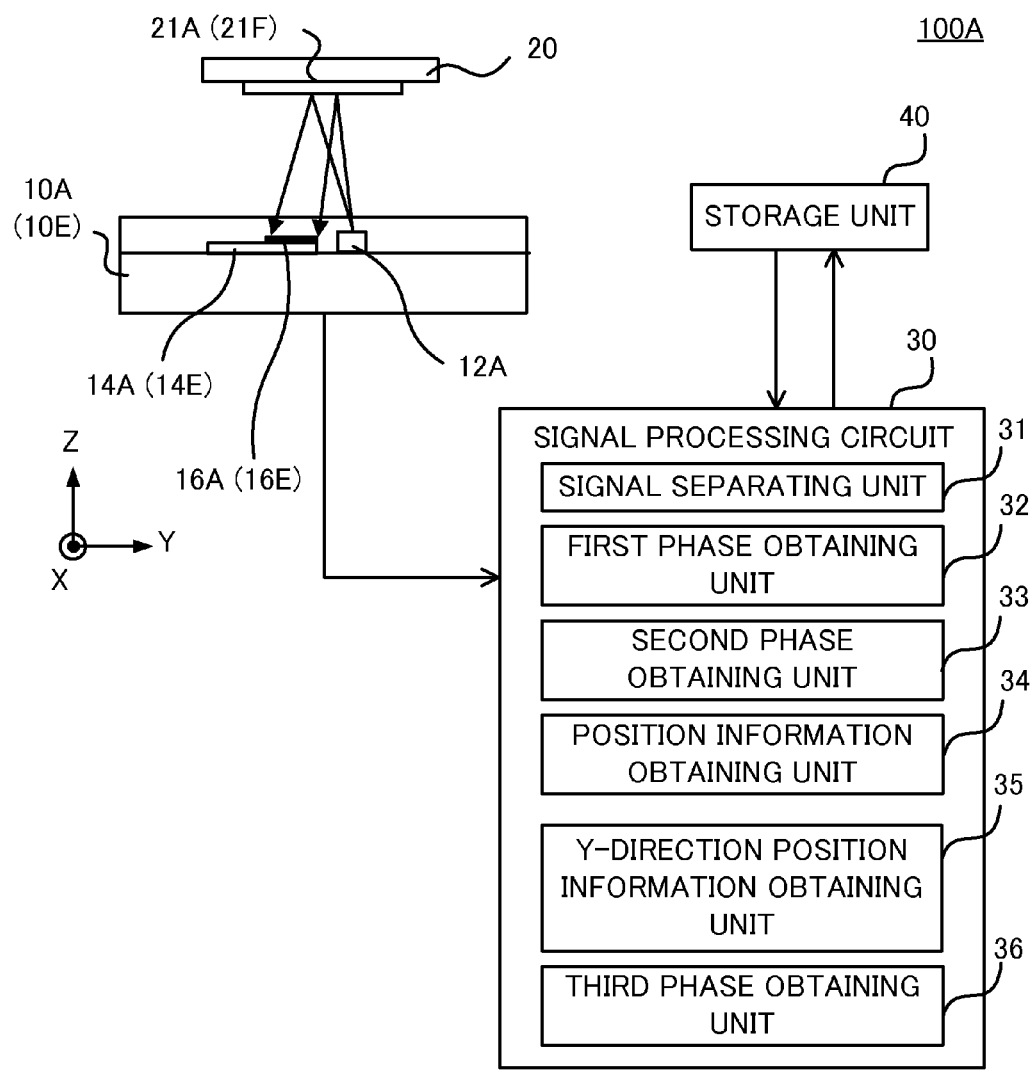
FIG. 1 is a schematic configuration diagram of an encoder in each of Embodiments 1, 2, and 4.

Exemplary embodiments of the present invention will be described below with reference to the accompanied drawings. In the drawings, the same elements will be denoted by the same reference numerals and the descriptions thereof will be omitted.

Embodiment 1

First of all, referring to FIG. 1, a configuration of an encoder in Embodiment 1 of the present invention will be described. The encoder of the present embodiment is used to detect a position (a displacement) of a movable portion (an object to be measured). FIG. 1 is a schematic configuration diagram of an encoder 100A in the present embodiment. The encoder 100A is configured by including a sensor unit 10A (a detector) that is attached to a fixed portion (not shown), a scale 20 that is attached to a movable portion (not shown), a signal processing circuit 30 (a signal processor), and a storage unit 40. The present embodiment is not limited to this, and conversely, the sensor unit 10A may be attached to the movable portion and also the scale 20 may be attached to the fixed portion if the sensor unit 10A and the scale 20 are configured to be movable relative to each other.

The sensor unit 10A is a sensor unit that is integrally configured by a light-receiving portion and a light-emitting portion, which mounts a light source 12A such as an LED and a light-receiving IC 14A having a light-receiving element array 16A in the same package. The light-receiving element array 16A functions as a detection element array in which a plurality of detection elements (a plurality of light receiving elements) that detect energy distributions from a pattern of the scale 20 are arrayed in an X direction that is a moving direction (a length measuring direction) of the scale 20 (or the movable portion). In the present embodiment, the energy distributions are light distributions, but the embodiment is not limited to this. The present embodiment can also be applied to a case where magnetic distributions, electric distributions, or the like are used as energy distributions. Accordingly, for example, a modulation of the energy distributions means a modulation by illuminating the light distributions (light intensity distributions, or temporal or spatial light intensity distributions) onto a scale having reflectance distributions or the like. The same is true for the magnetic distributions or the electric distributions. Thus, the sensor unit 10A is configured to be movable relative to the scale 20, and the plurality of detection elements that detect the energy distributions are arrayed in the moving direction (the X direction).

The scale 20 has a track 21A. In the track 21A, a pattern array including a plurality of patterns formed by a chromium reflective film is formed on a glass plate. The plurality of patterns formed on the track 21A are configured so as to spatially modulate an energy distribution such as a light distribution, a magnetic distribution, or an electric distribution. Thus, the scale 20 includes the plurality of patterns to spatially modulate the energy distribution.

The track 21A is provided with a plurality of regions having pitches (modulation periods) different from each other in an X direction with respect to a Y direction perpendicular to the X direction (a moving direction). For example, when two types of regions are provided as the plurality of regions, the track 21A is provided with a first region having a first pattern with a first pitch (a first modulation period) in the X direction and a second region having a second pattern with a second pitch (a second modulation period) in the X direction. The first modulation period and the second modulation period are different from each other. As described below, a relative phase between the first pattern and the second pattern changes in accordance with the direction (the Y direction) perpendicular to the moving direction.

In the present embodiment, the light-receiving element array 16A is configured so as to receive the reflected light from the pattern of the scale 20, but the present embodiment is not limited to this. The present embodiment can also be applied to a case where it is configured so as to receive transmitted light from the pattern of the scale 20. In other words, if the light-receiving element array 16A is configured to be able to receive the light from the pattern of the scale 20, any of the reflected light or the transmitted light from the pattern may be used.

The signal processing circuit 30 processes an output signal of the light-receiving element array 16A of the sensor unit 10A to be converted into position information. In other words, the signal processing circuit 30 processes the output signal of the sensor unit 10A to obtain the position information. The signal processing circuit 30 also performs an interpolation processing of an encoder signal obtained by the sensor unit 10A, writes a signal to a storage unit 40, and reads a signal from the storage unit 40. The signal processing circuit 30 includes a signal separating unit 31, a first phase obtaining unit 32, a second phase obtaining unit 33, a position information obtaining unit 34, and a Y-direction position information obtaining unit 35. The signal processing circuit 30 also includes a noise filter, an amplification circuit, and an A/D conversion circuit (not shown).

The signal separating unit 31 has a function of separating the output signal from the light-receiving element array 16A into signals corresponding to respective regions (the first region and the second region) of the track 21A. As described in the present embodiment, when the light-receiving IC 14A has a function of switching spatial resolution and a switch circuit to achieve the function, the signal separating unit 31 sends a signal to switch the spatial resolution (connection) to the switch circuit. On the other hand, when the light-receiving IC 14A does not have the function of switching the spatial resolution and the switch circuit to achieve the function, a fast Fourier transform (FFT) is performed to be able to separate the output signal from the light-receiving element array 16A. Thus, the signal separating unit 31 separates the first signal corresponding to the first pattern (the first region) and the second signal corresponding to the second pattern (the second region). Alternatively, the signal separating unit 31 may be achieved by providing a light-receiving element having separated light-receiving surfaces for each pattern pitch (for each region) on the light-receiving element array 16A.

The first phase obtaining unit 32 performs an arctangent calculation for the output signal from the light-receiving element array 16A (the output signal from the first pattern in the first region) so as to obtain a phase signal $\Phi1$ (a first phase) of the energy distribution in the first region. The first phase obtaining unit 32 may also function as a relative-position signal obtaining unit described below. The second phase obtaining unit 33 performs the arctangent calculation for the output signal from the light-receiving element array 16A (the output signal from the second pattern in the second region) so as to obtain a phase signal $\Phi2$ (a second phase)

of the energy distribution in the second region. When the track 21A is provided with a region (a third region) with a third pitch (a third modulation period) different from the first pitch and the second pitch, a third phase obtaining unit 36 is provided in the signal processing circuit 30 in accordance with the third region.

The position information obtaining unit 34 obtains the position information of the scale 20 based on the first phase and the second phase (and the third phase). The position information obtaining unit 34 may also include a relative-position signal obtaining unit that obtains a relative position signal representing a relative position of the scale 20 and an absolute-position signal obtaining unit that obtains an absolute position signal representing an absolute position of the scale 20.

When the position information of the scale 20 is detected, a divergent light beam emitted from the light source 12A provided in the sensor unit 10A is illuminated on the track 21A of the scale 20. Then, the light beam reflected by the track 21A is received by the light-receiving element array 16A of the sensor unit 10A. The light-receiving element array 16A receives a light as an image in which the reflectance distribution of the track 21A is magnified double. The light beam received by the light-receiving element array 16A is converted into an electric signal, and is sent to the signal processing circuit 30 as an encoder signal. The signal processing circuit 30 converts the output signal from the light-receiving element array 16A into the position information, and the position information of the scale 20 is obtained and outputted with high accuracy.

Figure 2:
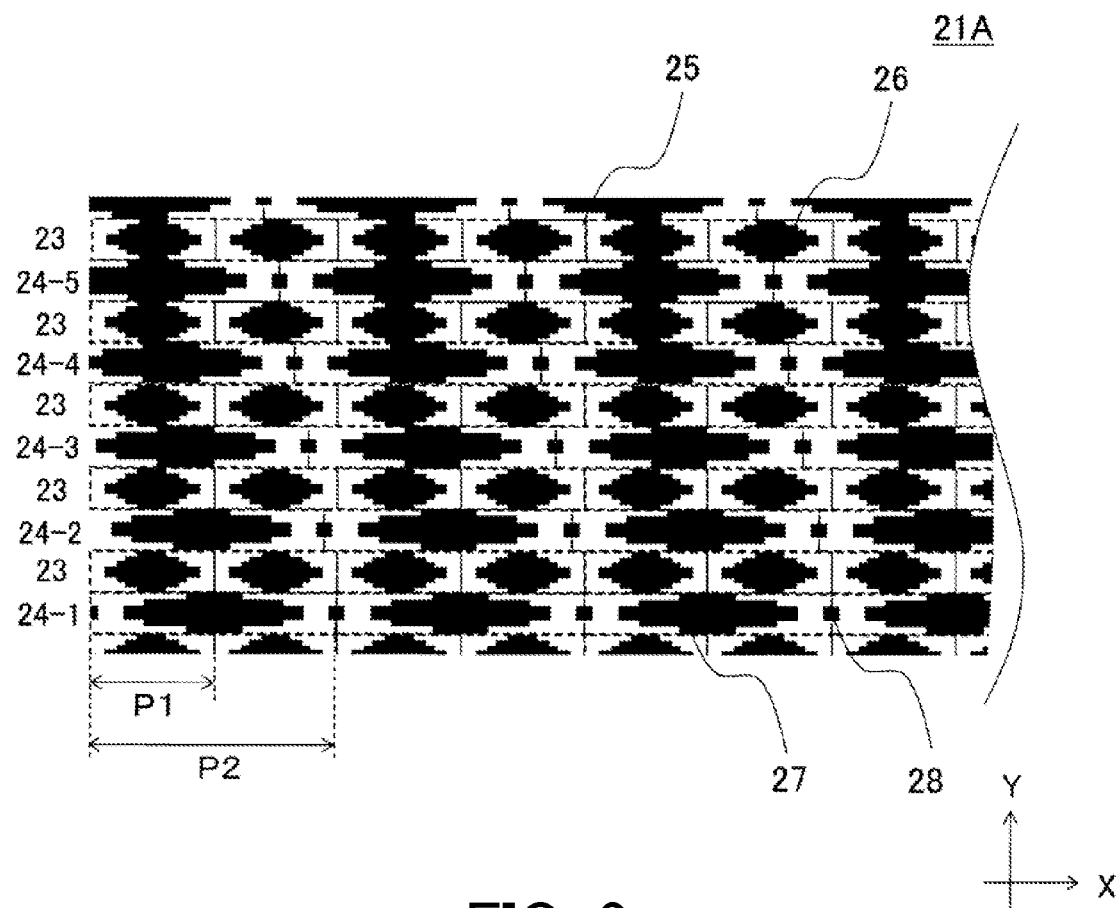
FIG. 2 is a partial plan view of a track in Embodiment 1.

Next, referring to FIG. 2, a configuration of the track 21A in the present embodiment will be described. FIG. 2 is a partial plan view of the track 21A. The track 21A is configured by alternately (sequentially) arraying two types of regions (a region 23 and a region 24) in the direction (the Y direction) perpendicular to the moving direction of the scale 20 (the X direction). In the region 24 (the second region), a period of a (N+1)th region 24-(N+1) is shifted to the X direction by −10 µm with reference to a period of a N-th region 24-N in the Y direction. Thus, the region 24 is configured by including regions 24-1, 24-2, 24-3, 24-4, 24-5, . . . . The region 23 corresponds to the first region described above, and the region 24 corresponds to the second region described above. In FIG. 2, a white portion is a non-reflective portion 25 that transmits or absorbs light. A black portion is reflective portions 26, 27, and 28 that reflect the light.

Figure 3:
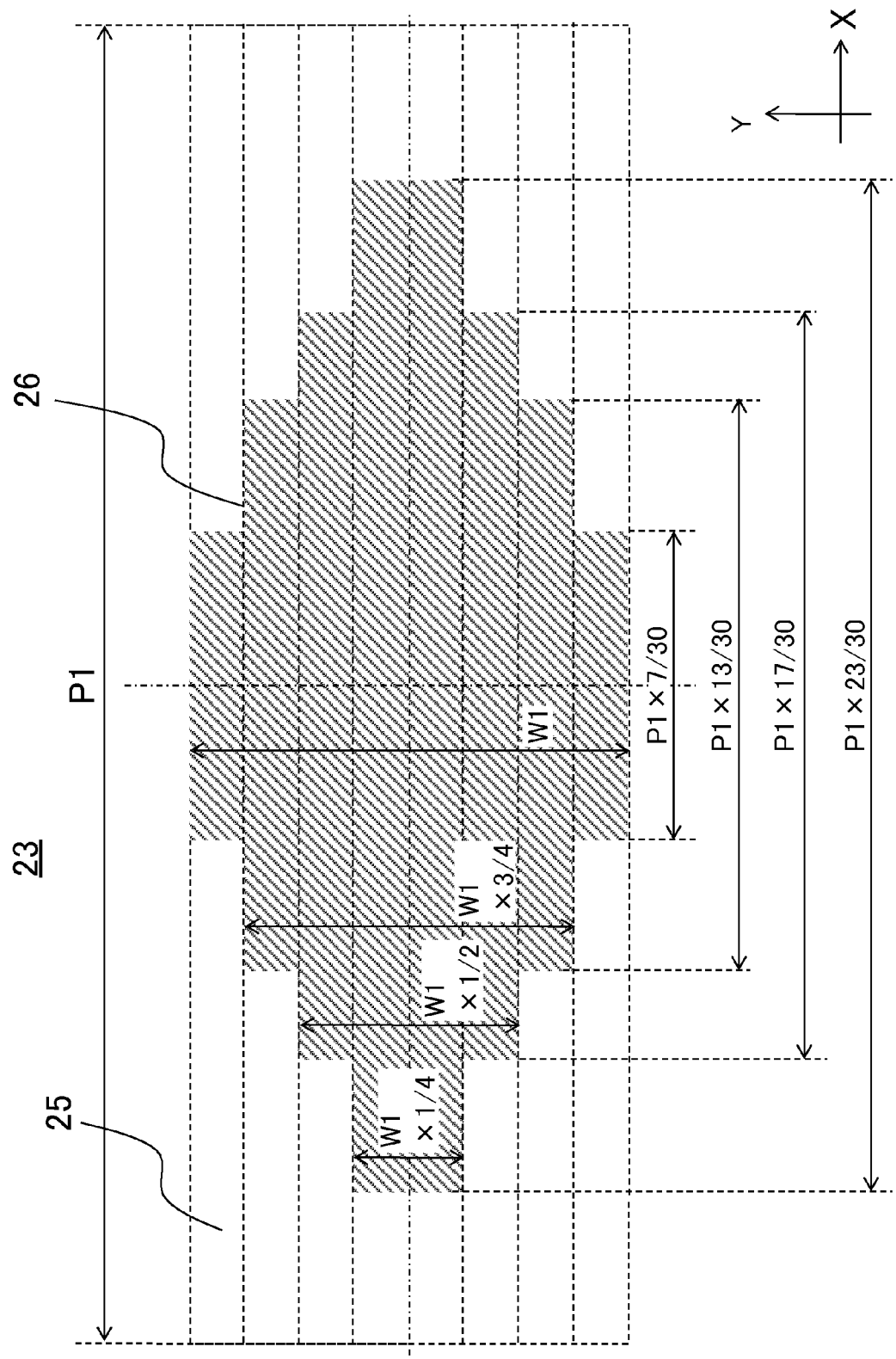
FIG. 3 is an enlarged plan view of a pattern in each of Embodiments 1 to 4.

Subsequently, referring to FIG. 3, a configuration of the region 23 (the first region) will be described. FIG. 3 is an enlarged plan view that illustrates one period in the X direction of the region 23. The region 23 is configured by a pattern array that includes a pattern illustrated in FIG. 3 for each pitch P1 in the X direction (a first modulation period, which is 128 µm in the present embodiment). Each pattern is configured by the reflective portion 26 that is constituted by a reflective film so as to reflect the light and the non-reflective portion 25. The pitch P1 functions as the first modulation period described above. In the present embodiment, a width W1 of the region 23 in the Y direction is 75 µm.

A width of the reflective portion 26 in the X direction is different in accordance with a position of the region 23 in the Y direction. In other words, the width of the reflective portion in the moving direction at a first position is different from the width at a second position different from the first position along the direction perpendicular to the moving direction. The width of the reflective portion 26 in the X direction is P1×23/30 within a range where a distance from a center in the Y direction is not more than W1/8. The width of the reflective portion 26 in the X direction is P1×17/30 within a range where the distance from the center in the Y direction is from W1/8 to W1/4. The width of the reflective portion 26 in the X direction is P1×13/30 within a range where the distance from the center in the Y direction is from W1/4 to W1×3/8. The width of the reflective portion 26 in the X direction is P1×7/30 within a range where the distance from the center in the Y direction is from W1×3/8 to W1/2.

Figure 4:
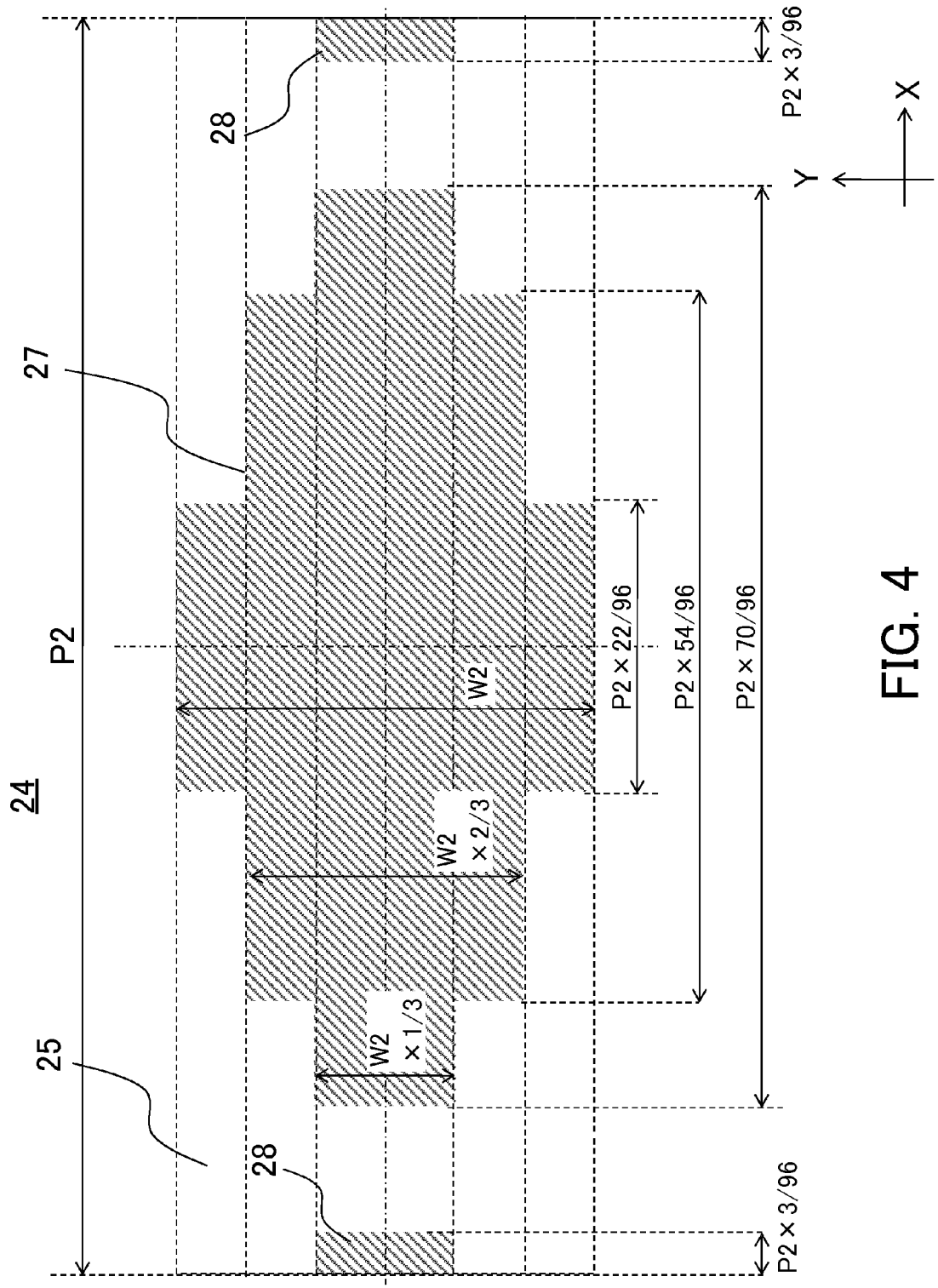
FIG. 4 is an enlarged plan view of a pattern in each of Embodiments 1 to 4.

Subsequently, referring to FIG. 4, a configuration of the region 24 (the second region) will be described. FIG. 4 is an enlarged plan view of illustrating one period of the region 24 in the X direction. The region 24 is configured by a pattern array that includes a pattern illustrated in FIG. 4 for each pitch P2 in the X direction (a second modulation period, which is 256 µm in the present embodiment). Each pattern is configured by the reflective portions 27 and 28 each of which is constituted by a reflective film so as to reflect the light and the non-reflective portion 25. The pitch P2 functions as the second modulation period described above. In the present embodiment, a width W2 of the region 24 in the Y direction is 75 µm.

A width of each of the reflective portions 27 and 28 in the X direction is different in accordance with a position of the region 24 in the Y direction. The width of the reflective portion 27 in the X direction is P2×70/96 within a range where a distance from a center in the Y direction is not more than W2/6. In this region, a reflective portion 28 is also formed with a width of P2×3/96 from each of both ends of the period. The width of the reflective portion 27 in the X direction is P2×54/96 within a range where the distance from the center in the Y direction is from W2/6 to W2×1/3. The width of the reflective portion 27 in the X direction is P2×22/96 within a range where the distance from the center in the Y direction is from W2×1/3 to W2×1/2.

Thus, each of the first pattern (the first region) and the second pattern (the second region) is configured by including the reflective portion that reflects the light and the non-reflective portion that does not reflect the light. The width of the reflective portion in the moving direction (the X direction) is different in the direction (the Y direction) perpendicular to the moving direction.

Figure 5:
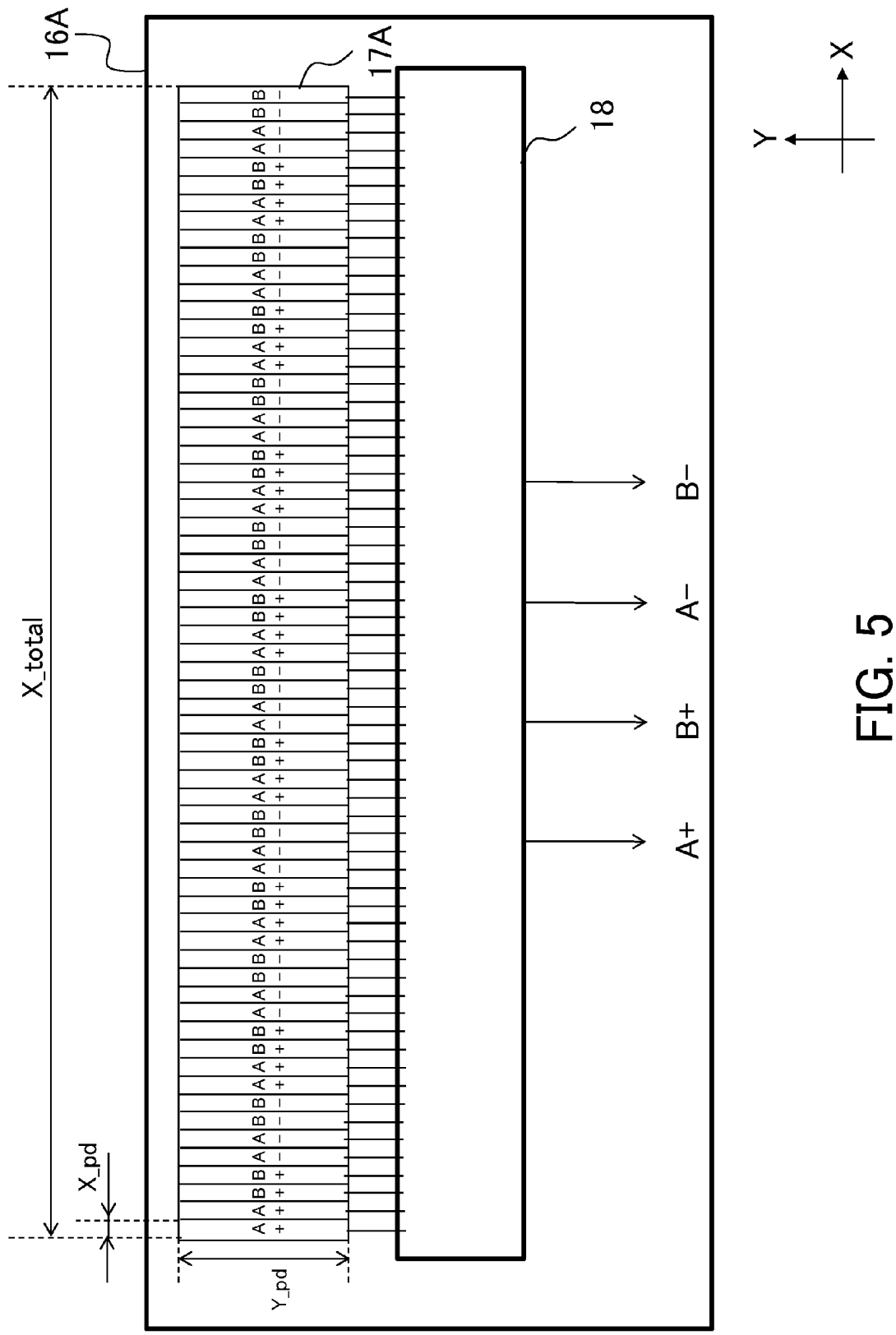
FIG. 5 is a plan view of a light-receiving surface of a light-receiving element array in Embodiment 1.
Figure 6:
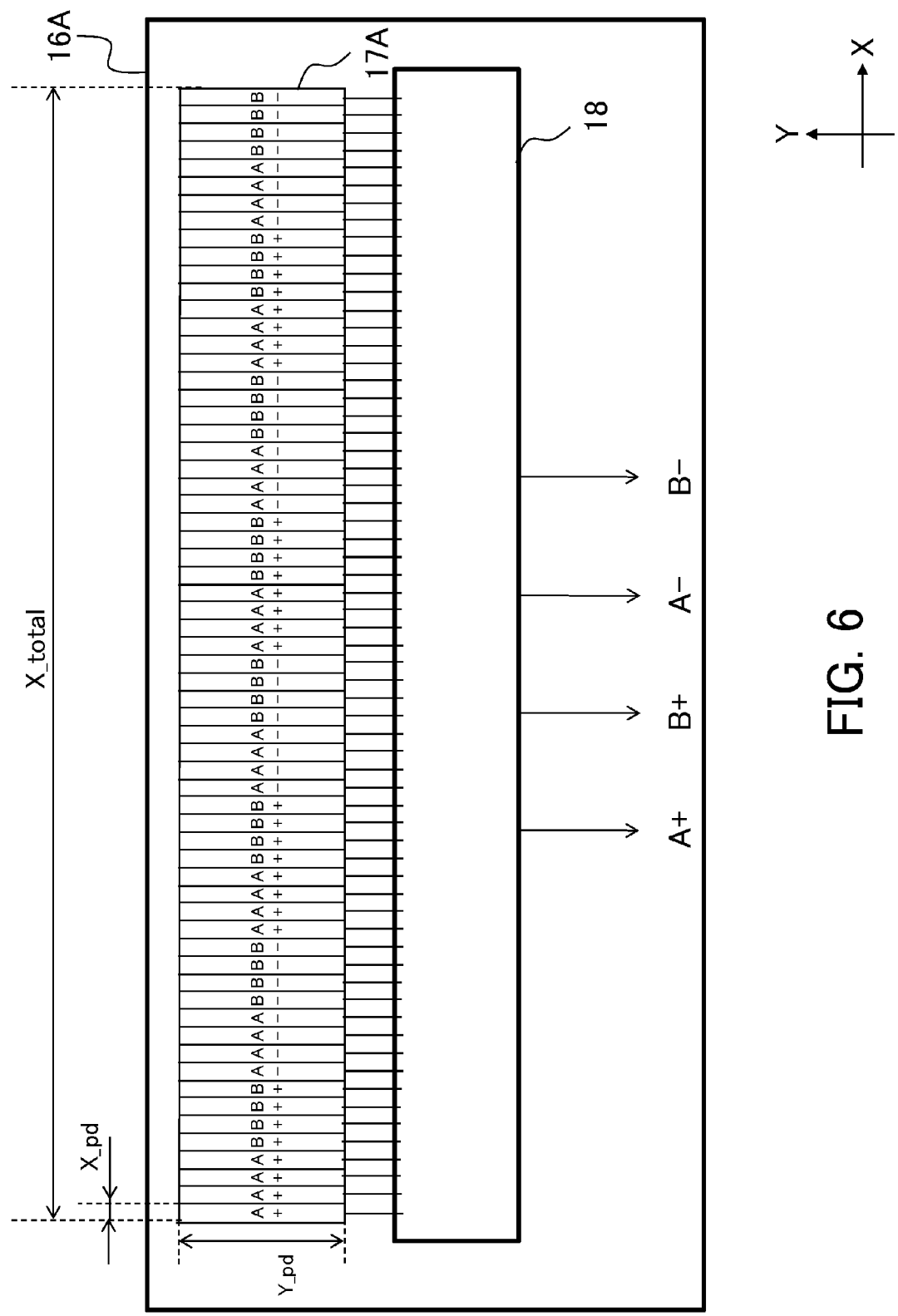
FIG. 6 is a plan view of the light-receiving surface of the light-receiving element array in Embodiment 1.

Subsequently, referring to FIGS. 5 and 6, a configuration of the light-receiving element array 16A in the present embodiment will be described. FIGS. 5 and 6 are plan views of the light-receiving surface of the light-receiving element array 16A. The light-receiving element array 16A includes 64 light-receiving elements 17A arrayed with a pitch of 32 µm in the X direction. A width X_pd of one light-receiving element 17A in the X direction is 32 µm, and a width Y_pd in the Y direction is 900 µm. A total width X_total of the light-receiving element array 16A is 2048 µm. Since the pattern on the scale 20 is doubled to be projected, a detection range on the scale 20 is a range of 450 µm in the Y direction and 1024 µm in the X direction. Since each of the widths W1 and W2 of the regions 23 and 24 in the Y direction is 75 µm, in the detection range on the scale 20, three lines along the Y direction for each of the region 23 with a pitch of 128 µm and the region 24 with a pitch of 256 µm in the position detecting direction are included.

The output signal from each of the light-receiving elements 17A is inputted to a switch circuit 18. The switch circuit 18 is connected to four first-stage amplifiers (not shown) arranged at the subsequent stage. The switch circuit 18 switches outputs so that only a predetermined output signal is selected from output signals of all the light-receiving elements 17A. The signal selected by the switch circuit 18 is outputted to the four first-stage amplifiers. The light-receiving elements 17A that correspond to output terminals A+, B+, A−, and B−, which indicate A+, B+, A−, and B− phases respectively, are connected to the four first-stage amplifiers. In this configuration, four-phase sine-wave outputs S(A+), S(B+), S(A−), and S(B−) are outputted to the four first-stage amplifiers.

The switch circuit 18 is configured to be able to switch the connection between the light-receiving element 17A and the output terminal in accordance with an input from the signal separating unit 31 of the signal processing circuit 30. Therefore, an interval of electric addition in the plurality of light-receiving elements 17A is switched. When the input from the signal processing circuit 30 is at a high level, as illustrated in FIG. 5, the scale pattern has a detection pitch of 128 µm (a period of a reflected image of 256 µm), and only a periodic signal from the region 23 can be separated. On the other hand, when the input from the signal processing circuit 30 is at a low level, as illustrated in FIG. 6, the scale pattern has a detection pitch of 256 µm (a period of a reflected image of 512 µm), and only a periodic signal from the region 24 can be separated.

Relative phases of the four-phase sine-wave signals have relations of around +90 degrees for S(B+), around +180 degrees for S(A−), and around +270 degrees for S(B−) for respective detection pitches with reference to S(A+). The signal processing circuit 30 performs the calculation represented by the following Expressions (1) and (2) for the four-phase sine-wave outputs S(A+), S(B+), S(A−), and S(B−) so as to generate two-phase sine-wave signals S(A) and S(B) where a direct-current component has been removed.

$$S(A)=S(A+)-S(A-) \quad (1)$$

$$S(B)=S(B+)-S(B-) \quad (2)$$

When the input to the switch circuit 18 is at a low level, S(A+) and S(A−) of S(A) have the same phase for an image of the scale pitch of 128 µm. Therefore, as a result of a differential calculation of Expression (1), S(A+) and S(A−) are canceled. The same is true for S(B).

The first phase obtaining unit 32 of the signal processing circuit 30 obtains a phase signal $\Phi 1$ (a first phase) of the energy distribution of the region 23 by the calculation represented by the following Expression (3), based on S(A) and S(B) when the input to the switch circuit 18 is at the high level. In Expression (3), symbol A TAN 2[Y,X] is an arctangent function that determines a quadrant so as to be converted into a phase of 0 to $2\pi$.

$$\Phi 1 = A\ TAN\ 2[S(A),S(B)] \quad (3)$$

Similarly, the second phase obtaining unit 33 of the signal processing circuit 30 obtains a phase signal $\Phi 2$ (a second phase) of the energy distribution of the region 24 by the calculation represented by the following Expression (4), based on S(A) and S(B) when the input to the switch circuit 18 is at the low level.

$$\Phi 2 = A\ TAN\ 2[S(A),S(B)] \quad (4)$$

The position information obtaining unit 34 of the signal processing circuit 30 obtains the output of the first phase obtaining unit 32 as a relative position signal. The position information obtaining unit 34 counts a change of the relative position signal to be able to obtain information that the number of the period where the scale 20 is positioned counted from a measurement start position as a predetermined period. When the function of switching the spatial resolution and the switch circuit is provided in the light-receiving IC 14A, only one position information obtaining unit is sufficient.

Next, a method of detecting a displacement of a relative position between the sensor unit 10A and the scale 20 in the direction (the Y direction in the drawing) perpendicular to the position detecting direction (the X direction in the drawing) will be described.

The Y-direction position information obtaining unit 35 of the signal processing circuit 30 obtains a signal Sy (a position signal) based on a calculation represented by the following Expression (5).

$$Sy = A \cdot \Phi 1 - B \cdot \Phi 2 \quad (5)$$

In Expression (5), symbols A and B are arbitrary coefficients that satisfy a relation of A/B=P1/P2 when the first modulation period is P1 and the second modulation period is P2.

Since the value of each of $\Phi 1$ and $\Phi 2$ is shifted by $2\pi$ when moving from the fourth quadrant to the first quadrant, in order to keep the continuity of the value without depending on the position in the X direction, it is preferred that the following process is performed.

First of all, a coefficient k where each of A×k and B×k indicates an integer is multiplied by Sy so as to replace Sy. Alternatively, A and B may be set by an integer. In the following embodiment, the coefficient corresponding to each of A and B is set by the integer. Furthermore, the signal processing circuit 30 repeats the calculation of Sy=Sy+2π when Sy<−π is satisfied and repeats the calculation of Sy=Sy−2π when Sy>+π is satisfied so as to convert the signal Sy into an output range between −π and +π.

Subsequently, it will be described that the signal Sy corresponds to the displacement of the relative position in the Y direction between the sensor unit 10A and the scale 20. The phase signal $\Phi 1$ (the first phase) of the energy distribution of the region 23 does not depend on a position y in the Y direction, and can be approximated as the following Expression (6) with respect to a position x in the X direction.

$$\Phi 1 \approx 2\ \pi \times (x/P1) + C1 \quad (6)$$

In Expression (6), symbol C1 denotes a predetermined constant.

On the other hand, a width of one period of the region 24 in the Y direction is 150 µm, and the position is shifted by 10 µm per one period. Therefore, the phase signal $\Phi 2$ (the second phase) of the energy distribution of the region 24 can be approximated as represented by the following Expression (7) with respect to the positions x and y.

$$\Phi 2 \approx 2\pi \times (x/P2) + 2\pi \times (y/P2) \times (10/150) + C2 \quad (7)$$

In Expression (7), symbol C2 denotes a predetermined constant.

In this case, since the relation of P1/P2=1/2 is satisfied, Expression (5) is represented as Sy=1·Φ1−2·Φ2. The calculation result of Expression (5) can be represented as the following Expression (8).

$$Sy \approx y \times (-4\pi/(15 \times P2)) + (C1 - 2 \times C2) \quad (8)$$

Thus, the signal Sy changes linearly (or substantially linearly) with respect to the position in the Y direction without depending on the position in the X direction.

Monitoring the value of the obtained signal Sy, a displacement and its direction of a scan line of the sensor (the sensor unit 10A) can be easily detected. If an LED lamp is turned on in accordance with the value of the signal Sy, the positioning can be performed more easily. For example, the scale pattern may be set so that a reading position on the scale 20 indicates Sy=0 at a center (or around the center) of the width in the Y direction. The LED lamp is set so that a red lamp is turned on when Sy<0 is satisfied, a blue lamp is turned on when Sy>0 is satisfied, and a white lamp is turned on when Sy≈0 is satisfied, and thus the direction of the displacement is obvious and a worker can easily perform the relative positioning between the sensor unit 10A and the scale 20. Obtaining the signal without any time difference (with a small time difference) before and after switching the input to the switch circuit 18, the phase signals Φ1 and Φ2 at the same position (at substantially the same position) can be obtained.

In the present embodiment, as illustrated in FIGS. 5 and 6, at least a part of the plurality of light-receiving elements 17A contained in the light-receiving element array 16A is shared as a light-receiving element that obtains the phase signal Φ1 and a light-receiving element that obtains the phase signal Φ2. Therefore, compared to a case where the light-receiving elements that obtain both the phase signals are separately provided as conventionally adopted, a size of the light-receiving element array is reduced.

While the scale 20 moves at high speed, the synchronization is deteriorated. In this case, it is preferred that a plurality of signals (phases) are obtained and the phases are averaged so as to ensure the synchronization. First of all, the signals S(A+), S(A−), S(B+), and S(B−) are obtained with a detection pitch of 128 μm and the input to the switch circuit is switched from the high level to the low level. Subsequently, the signals S(A+), S(A−), S(B+), and S(B−) are obtained with a detection pitch of 256 μm, and the input to the switch circuit 18 is switched from the low level to the high level so as to obtain the signals S(A+), S(A−), S(B+), and S(B−) with the detection pitch of 128 μm. Intervals of timings of obtaining the signals are substantially constant. Averaging the first phase signal Φ1 and the second phase signal Φ1 calculated based on these signals, the synchronization of the phase signal Φ1 and the phase signal Φ2 can be improved.

Figure 7:
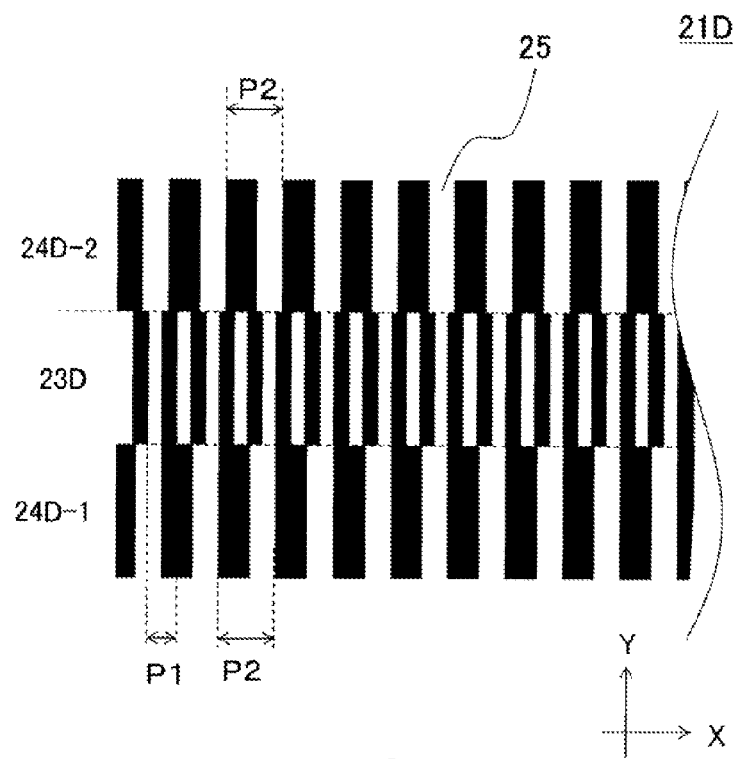
FIG. 7 is a partial plan view of a track of another example in Embodiment 1.

The track 21A of the present embodiment is configured by periodically arraying two regions in a direction (the Y direction) perpendicular to a scale moving direction, which have pitches (modulation periods) different from each other in the scale moving direction (the X direction), but the present embodiment is not limited to this. For example, instead of the track 21A, a track 21D as illustrated in FIG. 7 can also be used. FIG. 7 is a partial plan view of the track 21D as another example in the present embodiment.

As illustrated in FIG. 7, a region 23D (a first region) having a first pattern with a first modulation period (128 μm) is formed on the track 21D. In addition, a region 24D-1 and a region 24D-2 (a plurality of second regions) each having a second pattern with a second modulation period (256 μm) are formed on the track 21D. The region 23D (the first region) is adjacent to each of the regions 24D-1 and 24D-2 (the plurality of second regions) to be provided between the regions 24D-1 and 24D-2 in the direction (the Y direction) perpendicular to the moving direction. The region 24D-1 is shifted by −43 μm in the X direction with respect to the region 24D-2. In FIG. 7, a white portion is the non-reflective portion 25 that transmits and absorbs the light.

Each of widths of the regions 23D, 24D-1, and 24D-2 is 225 μm. Therefore, when a center of the region 23D in the Y direction and the detection range on the scale 20 by the light-receiving element array 16A coincide with each other, the region 23D is ½ of the Y width that is the detection range and each of the regions 24D-1 and 24D-2 is ¼ of the Y width that is the detection range. When the center of the region 23D in the Y direction and the detection range on the scale 20 by the light-receiving element array 16A are shifted from each other, a ratio of the region 24D-1 and the region 24D-2 is varied. Therefore, using the calculation similar to that of Expression (5), the position in the Y direction can be detected. Furthermore, a displacement (a shift amount) of the regions 24D-1 and 24D-2 in the X direction is ⅙ (nearly ⅙) of the second modulation period. Accordingly, when the detection range in the Y direction is positioned at the center of the scale 20, a component of a third harmonic distortion is removed from a waveform (a detected waveform) detected by using Expressions (1) and (2).

Figure 8:
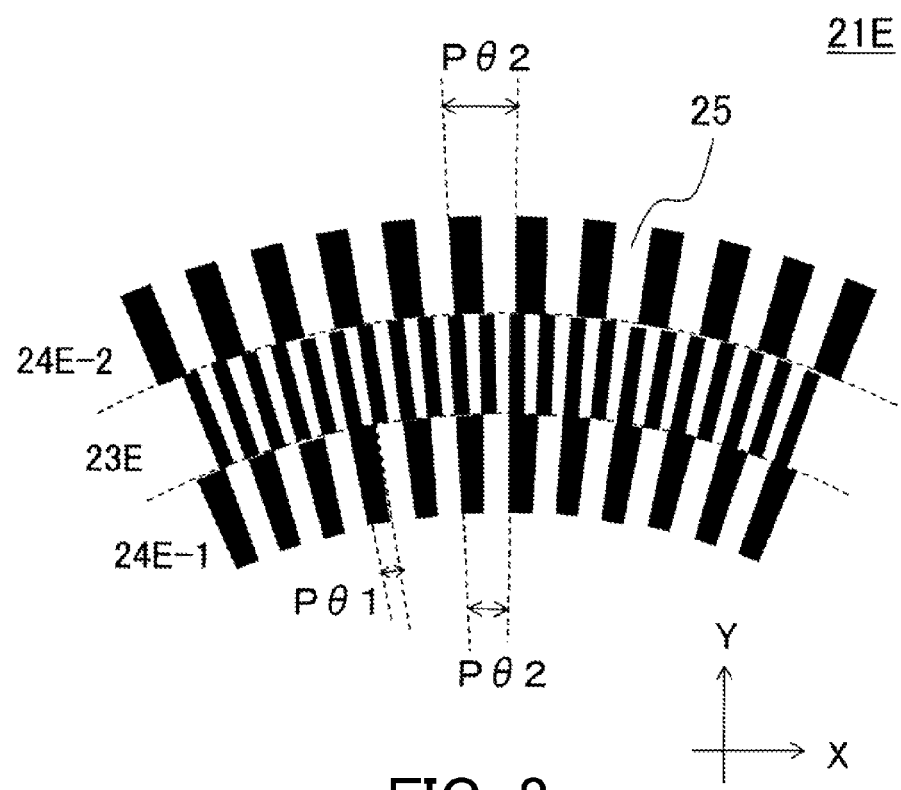
FIG. 8 is a partial plan view of a track of another example in Embodiment 1.

The present embodiment is not limited to a linear encoder, but also can be applied to a rotary encoder. When the rotary encoder is adopted, for example as illustrated in FIG. 8, the scale pattern is radially arranged and the period in the moving direction is replaced with an angle. FIG. 8 is a partial plan view of a track 21E that is another example in the present embodiment. In FIG. 8, a region 23E (a first region) having a first modulation period Pθ1 (0.18 degree) is adjacent to a region 24E-1 and 24E-2 (collectively, a second region) having a second modulation period Pθ2 (0.36 degree) and is arranged between the regions 24E-1 and 24E-2.

In the present embodiment, an optical encoder is used as the encoder 100A, but the embodiment is not limited to this. For example, a magnetic encoder, a capacitance encoder, or the like can also be used to obtain the similar effect. When the magnetic encoder that uses magnetic distributions as energy distributions is adopted, a magnetic material is used as the scale 20, and polarity distributions of the magnetic property are formed similarly to the shape of the reflective film of the scale 20 of the present embodiment. Then, a magnetic-field detection element that is arrayed near this scale is arranged to detect the magnetic distributions. When the capacitance encoder that uses electric distributions as the energy distributions is used, an electrode pattern having conductivity may be formed to have a shape similar to the shape of the scale reflective film of the present embodiment, and another electrode pattern having an arrayed shape may be closely faced to detect the electric distributions.

According to the present embodiment, small-size and low-cost encoder and scale capable of detecting a relative position between a scale and a detector in a direction perpendicular to a scanning direction (a moving direction), as well as the scanning direction, with high accuracy can be provided.

Embodiment 2

Figure 11:
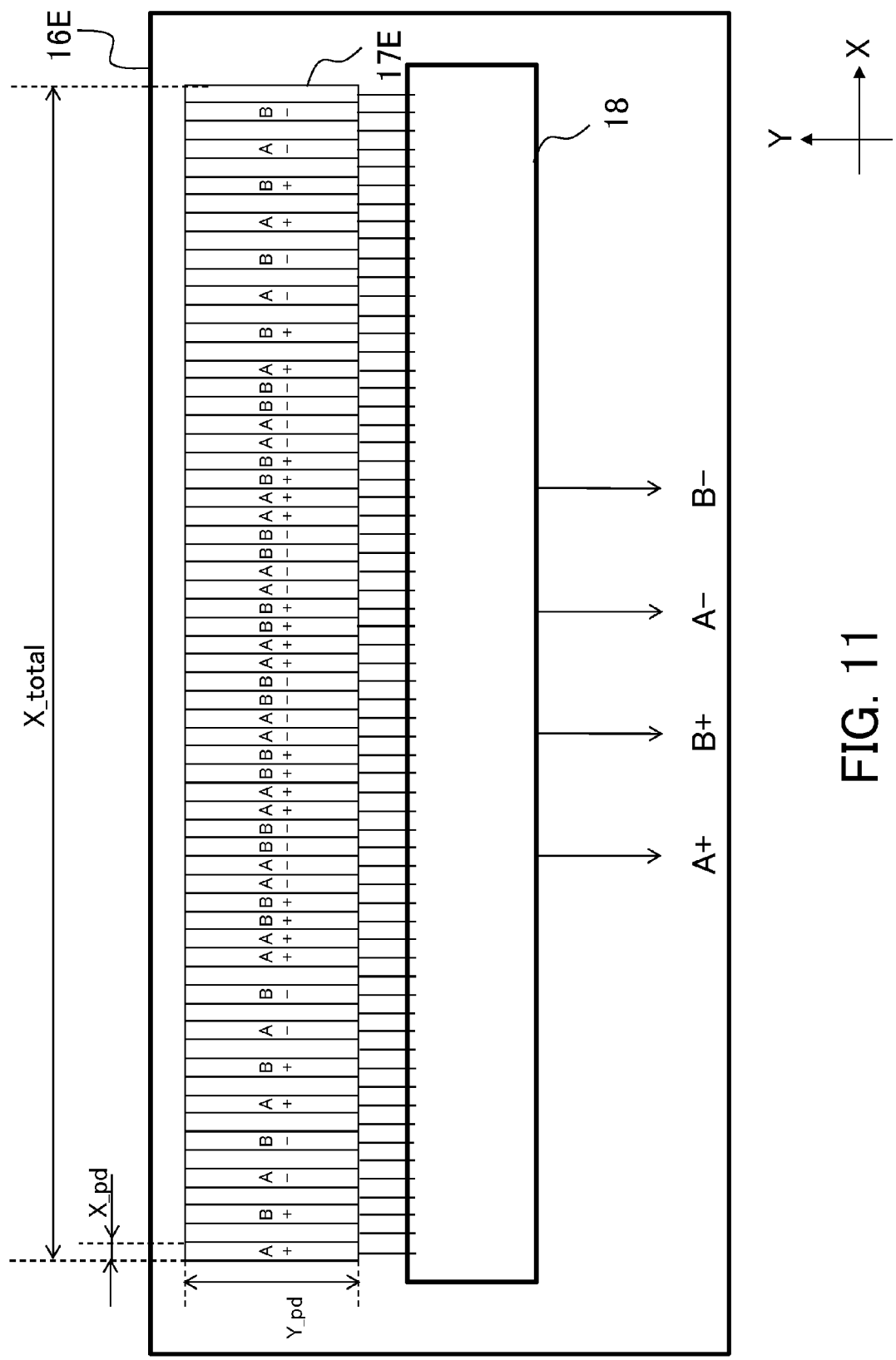
FIG. 11 is a plan view of a light-receiving surface of a light-receiving element array in each of Embodiments 2 and 3.
Figure 12:
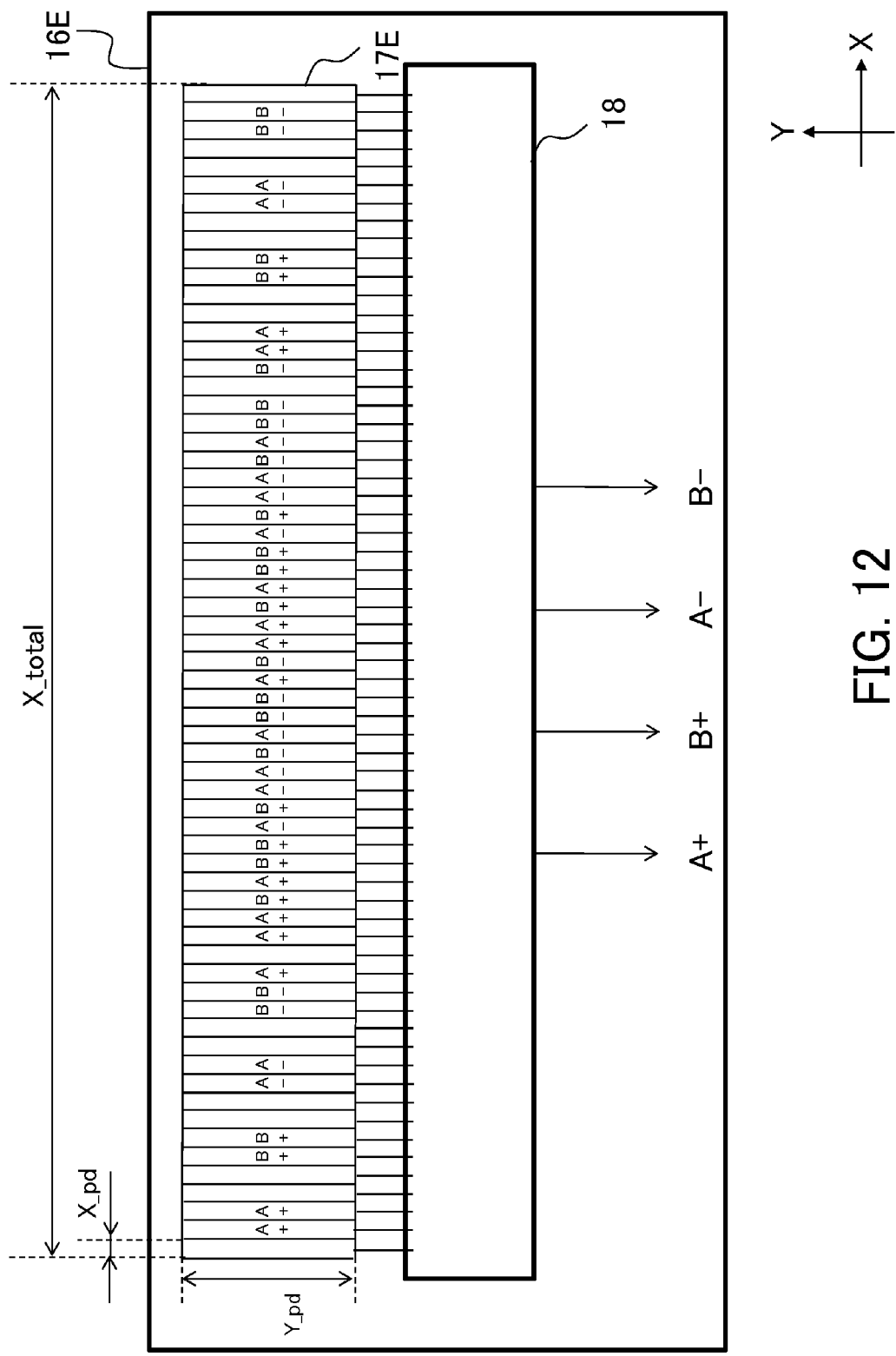
FIG. 12 is a plan view of a light-receiving surface of a light-receiving element array in each of Embodiments 2 and 3.
Figure 13:
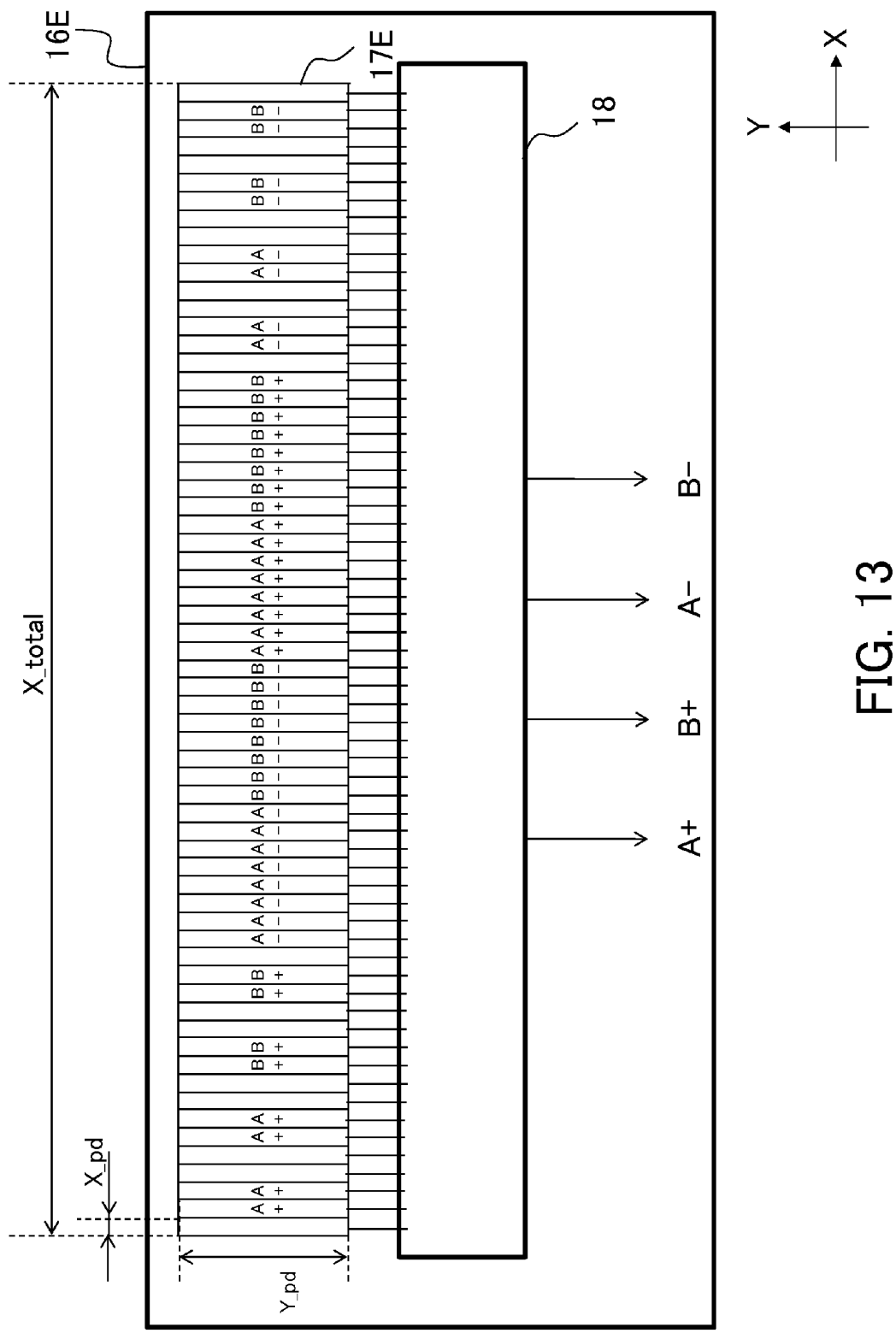
FIG. 13 is a plan view of the light-receiving surface of the light-receiving element array in each of Embodiments 2 and 3.

Next, an encoder in Embodiment 2 of the present invention will be described. The encoder of the present embodiment uses a track 21F instead of the track 21A of Embodiment 1. Furthermore, instead of the light-receiving IC 14A of Embodiment 1, a light-receiving IC 14E including a light-receiving element array 16E illustrated in FIGS. 11, 12, and 13 is used. Other configurations are the same as those in Embodiment 1, and therefore descriptions of the configurations are omitted.

Figure 9:
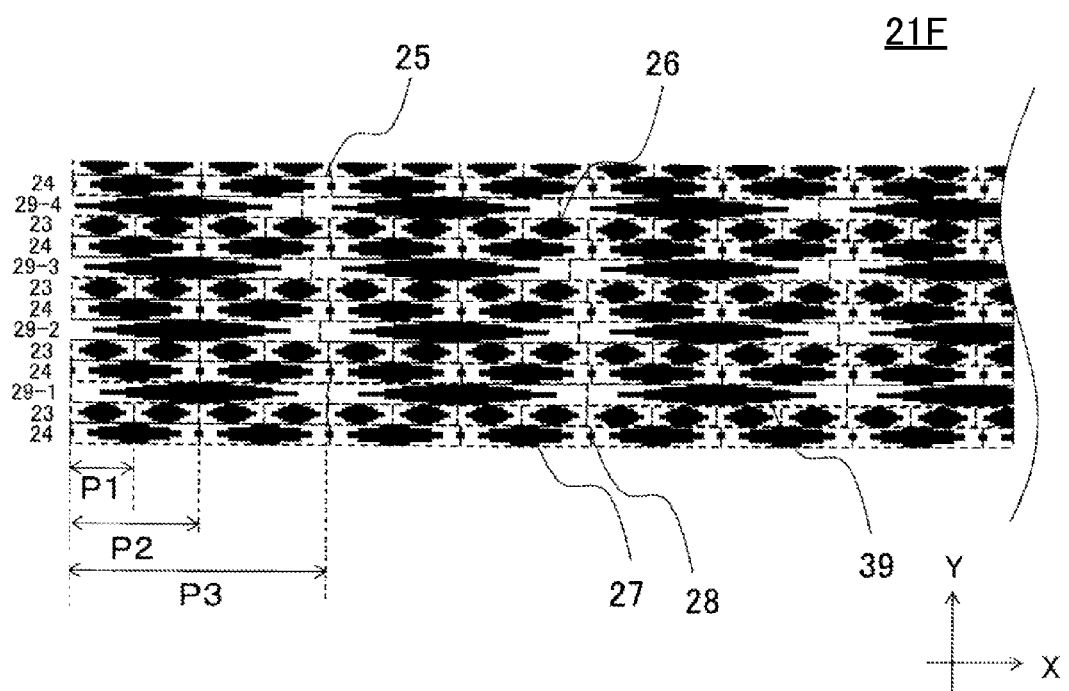
FIG. 9 is a partial plan view of a track in each of Embodiments 2 and 4.

Referring to FIG. 9, a configuration of the track 21F of the present embodiment will be described. FIG. 9 is a partial plan view of the track 21F. In the track 21F, three types of regions (regions 23, 29, and 24) are periodically arrayed in this order in the direction (the Y direction) perpendicular to the moving direction (the X direction) of the scale 20.

Furthermore, in the region 29, a period of a (N+1)th region 29-(N+1) is shifted by −10 μm in the X direction with reference to a period of an N-th region 29-N in the Y direction.

The region 23 (the first region) is configured as illustrated in FIG. 3, which includes a pattern array in which the pattern of FIG. 3 is arranged with the pitch P1 (the first modulation period, i.e. 128 μm in the present embodiment). In the present embodiment, the width W1 of the region 23 in the Y direction is 50 μm. The width of the reflective portion 26 in the X direction is different in accordance with the position of the region 23 in the Y direction, similarly to Embodiment 1.

The region 24 (the third region) is configured as illustrated in FIG. 4, which includes a pattern array in which the pattern of FIG. 4 is arranged with the pitch P2 (the third modulation period, i.e. 257.560976 μm in the present embodiment). In the present embodiment, the width W2 of the region 24 in the Y direction is 50 μm. The width of each of the reflective portion 27 and 28 in the X direction is different in accordance with the position of the region 24 in the Y direction, similarly to Embodiment 1.

Figure 10:
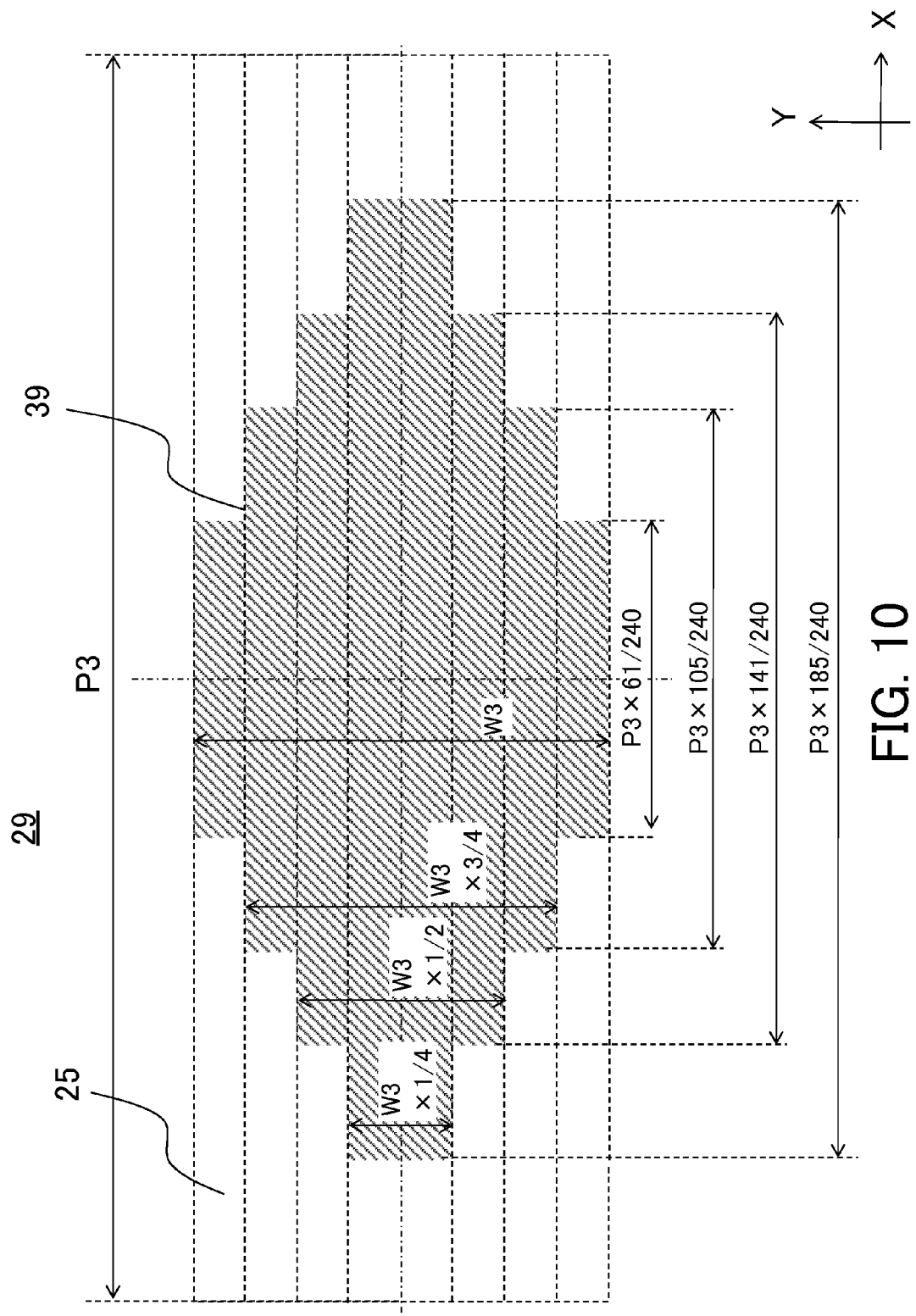
FIG. 10 is an enlarged plan view of a pattern in each of Embodiments 2 to 4.

Subsequently, referring to FIG. 10, a configuration of the region 29 (the second region) will be described. FIG. 10 is an enlarged plan view of illustrating one period of the region 29 in the X direction. The region 29 has a pattern array that includes the pattern of FIG. 10 with a pitch P3 (the second modulation period, i.e. 512 μm in the present embodiment) in the X direction. Each pattern in the region 29 is configured by a reflective portion 39 that is constituted by a reflective film so as to reflect the light and the non-reflective portion 25. In the present embodiment, a width W3 of the region 29 in the Y direction is 50 μm.

A width of the reflective portion 39 is different in accordance with a position of the region 29 in the Y direction. Within a range where a distance from the center in the Y direction is not more than W3/8, the width of the reflective portion 39 in the X direction is P3×185/240. Within a range where the distance from the center in the Y direction is from W3/8 to W3/4, the width of the reflective portion 39 in the X direction is P3×141/240. Within a range where the distance from the center in the Y direction is from W3/4 to W3×3/8, the width of the reflective portion 39 in the X direction is P3×105/240. Within a range where the distance from the center in the Y direction is from W3×3/8 to W3/2, the width of the reflective portion 39 in the X direction is P3×61/240.

Thus, the third pattern that has the third modulation period different from each of the first modulation period and the second modulation period is formed on the track 21F in the moving direction (the X direction). A relative phase between the third pattern and the second pattern changes in accordance with the direction (the Y direction) perpendicular to the moving direction.

Subsequently, referring to FIGS. 11 to 13, a configuration of the light-receiving element array 16E in the present embodiment will be described. FIGS. 11 to 13 are plan views of the light-receiving surface of the light-receiving element array 16E in the light-receiving IC 14E. The light-receiving element array 16E includes 64 light-receiving elements 17E with a pitch of 32 μm in the X direction. A width X_pd of one light-receiving element 17E in the X direction is 32 μm, and a width Y_pd in the Y direction is 900 μm. A total width X_total of the light-receiving element array 16E is 2048 μm.

Since the pattern on the scale 20 is doubled to be projected, a detection range on the scale 20 is a range of 450 μm in the Y direction and 1024 μm in the X direction.

Therefore, in the detection range on the scale 20, three lines along the Y direction for each of the region 23 with a pitch of 128 μm, the region 24 with a pitch of 257.560976 μm, and the region 29 with a pitch of 512 μm in the position detecting direction are included.

The output signal from each of the light-receiving elements 17E is inputted to a switch circuit 18. The switch circuit 18 is connected to four first-stage amplifiers (not shown) arranged at the subsequent stage. The switch circuit 18 switches outputs so that only a predetermined output signal is selected from output signals of all the light-receiving elements 17E. The signal selected by the switch circuit 18 is outputted to the four first-stage amplifiers. The light-receiving elements 17E that correspond to output terminals A+, B+, A−, and B−, which indicate A+, B+, A−, and B− phases respectively, are connected to the four first-stage amplifiers. In this configuration, four-phase sine-wave outputs S(A+), S(B+), S(A−), and S(B−) are outputted to the four first-stage amplifiers.

The switch circuit 18 is configured to be able to switch the connection between the light-receiving element 17E and the output terminal in accordance with an input from the signal separating unit 31 of the signal processing circuit 30. Therefore, an interval of electric addition in the plurality of light-receiving elements 17E is switched. When the input from the signal processing circuit 30 is at a high level, as illustrated in FIG. 11, the scale pattern has a detection pitch of 128 μm (a period of a reflected image of 256 μm), and only a periodic signal from the region 23 can be separated. On the other hand, when the input from the signal processing circuit 30 is at a low level, as illustrated in FIG. 12, the scale pattern has a detection pitch of 256 μm (a period of a reflected image of 512 μm), and only a periodic signal from the region 24 can be separated. When the input from the signal processing circuit 30 is at a middle level, as illustrated in FIG. 13, the scale pattern has a detection pitch of 512 μm (a period of a reflected image of 1024 μm), and only a periodic signal from the region 29 can be separated.

Relative phases of the four-phase sine-wave signals have relations of around +90 degrees for S(B+), around +180 degrees for S(A−), and around +270 degrees for S(B−) for respective detection pitches with reference to S(A+). The signal processing circuit 30 performs the calculation represented by the above Expressions (1) and (2) for the four-phase sine-wave outputs S(A+), S(B+), S(A−), and S(B−) so as to generate two-phase sine-wave signals S(A) and S(B) where a direct-current component has been removed.

When the input from the signal processing circuit 30 is at a high level, as illustrated in FIG. 11, an area of the light-receiving element array for each phase corresponding to each period is two arrays at a center of the light-receiving surface, and on the other hand, the area is one array at the periphery. Thus, in the present embodiment, a weighting unit that performs the weighting in accordance with a position of the plurality of detection elements for the output signals of the plurality of detection elements that detect the first pattern (the first modulation period) is provided in a sensor unit 10E. The weighting unit is set so that a value obtained by the weighting is not more than a value obtained without the weighting within a predetermined range that includes a spatial frequency corresponding to the pitch P3 (the second modulation period) of the spatial frequency response of the first phase obtaining unit 32.

When the input from the signal processing circuit 30 is at a low level, as illustrated in FIG. 12, an area of the light-receiving element array for each phase corresponding to each period is four arrays at a center of the light-receiving surface, and on the other hand, the area is two arrays at the periphery. In addition, the four arrays at the center are not continuous light-receiving elements, and two arrays at both ends are replaced with the adjacent detection phase. As a result, compared to a case where the continuous four arrays are accumulated, an effective accumulation width increases and the influence of the periodic component from the region 23 can be reduced.

When the input from the signal processing circuit 30 is at a middle level, as illustrated in FIG. 13, an area of the light-receiving element array for each phase corresponding to each period is eight arrays at a center of the light-receiving surface, and on the other hand, the area is two arrays at the periphery. With respect to S(A), S(A+) and S(A−) have the same phase component (substantially the same phase component) for an image of P1=128 μm and P2=257.560976 μm. Therefore, as a result of the above differential calculation, the periodic components of the regions 23 and 24 are cancelled and decay. The same is true for S(B).

Next, a flow of the process of performing position detection will be described. The first phase obtaining unit 32 of the signal processing circuit 30 obtains a phase (a phase signal Φ1) of the energy distribution of the region 23 by the calculation represented by the following Expression (9), based on S(A) and S(B) when the input to the switch circuit 18 is at the high level. In Expression (9), symbol A TAN 2[Y,X] is an arctangent function that determines a quadrant so as to be converted into a phase of 0 to 2π.

$$\Phi 1 = A\ TAN\ 2[S(A), S(B)] \quad (9)$$

Similarly, the third phase obtaining unit 36 of the signal processing circuit 30 obtains a phase (a phase signal Φ2) of the energy distribution of the region 24 by the calculation represented by the following Expression (10), based on S(A) and S(B) when the input to the switch circuit 18 is at the low level.

$$\Phi 2 = A\ TAN\ 2[S(A), S(B)] \quad (10)$$

Furthermore, the second phase obtaining unit 33 of the signal processing circuit 30 obtains a phase (a phase signal Φ3) of the energy distribution of the region 29 by the calculation represented by the following Expression (11), based on S(A) and S(B) when the input to the switch circuit 18 is at the middle level.

$$\Phi 3 = A\ TAN\ 2[S(A), S(B)] \quad (11)$$

Obtaining the signal without any time difference (with a small time difference) before and after switching the input to the switch circuit 18, the phase signals Φ1, Φ2, and Φ3 at the same position (at substantially the same position) can be obtained.

Next, a method of detecting a displacement of the relative position between the sensor unit 10E and the scale 20 in the direction (the Y direction in the drawing) perpendicular to the position detecting direction (the X direction in the drawing) will be described.

First of all, the Y-direction position information obtaining unit 35 of the signal processing circuit 30 obtains the signal Sy (the position signal) by the calculation represented by the following Expression (12).

$$Sy = \Phi 1 - 4 \cdot \Phi 3 \quad (12)$$

The signal processing circuit 30 repeats the calculation of Sy=Sy+2π when Sy<−π is satisfied and repeats the calculation of Sy=Sy−2π when Sy>+π is satisfied so as to convert the signal Sy into an output range between −π and +π. Monitoring the value of the obtained signal Sy, a displacement and its direction of a scan line of the sensor (the sensor unit 10E) can be easily detected.

The position information obtaining unit 34 of the present embodiment generates a vernier signal described below based on output signals of the first phase obtaining unit 32 and the third phase obtaining unit 36 so as to obtain absolute position information of the scale 20. The position information obtaining unit 34 of the signal processing circuit 30 obtains a vernier signal Sv that functions as an absolute position signal by the calculation represented by the following Expression (13).

$$Sv = \Phi 1 - 2 \cdot \Phi 2 \quad (13)$$

The signal processing circuit 30 repeats the calculation of Sv=Sv+2π when Sv<0 is satisfied and repeats the calculation of Sv=Sv−2π when Sv>2π is satisfied so as to convert the signal Sv into an output range between 0 and 2π. The relations between the phase signals Φ1 and Φ2 of the pitches P1 and P2 and the position x in the X direction are represented as the following Expressions (14) and (15), respectively.

$$\Phi 1 \approx 2\pi \times (x/P1) + C1 \quad (14)$$

$$\Phi 2 \approx 2\pi \times (x/P2) + C2 \quad (15)$$

In the present embodiment, the vernier signal Sv is not limited to the coefficients of the phase signals Φ1 and Φ2 indicated by Expression (13). With respect to the pitches P1 and P2 (the first modulation period and the second modulation period), the vernier signal Sv can be generalized as Sv=A·Φ1−B·Φ2 using two coefficients A and B which satisfy the relation of A/B=n/m for integers m and n which satisfy a condition of |(m·P1−n·P2)|<|(P1−P2)|.

As indicated by the following Expression (16), the value of Φ1−2·Φ2 is a position change amount in the X direction that changes from 0 to ±2π. In Expression (16), symbol Tv denotes a period of the vernier signal (a total stroke).

$$\Phi 1 - 2 \cdot \Phi 2 = 2\pi \cdot Tv/P1 - 2 \cdot 2\pi \cdot Tv/P2 = \pm 2\pi \quad (16)$$

Therefore, the period Tv of the vernier signal Sv can be represented as the following Expression (17).

$$Tv = |P1 \cdot P2/(2 \cdot P1 - P2)| \quad (17)$$

Figure 14A:
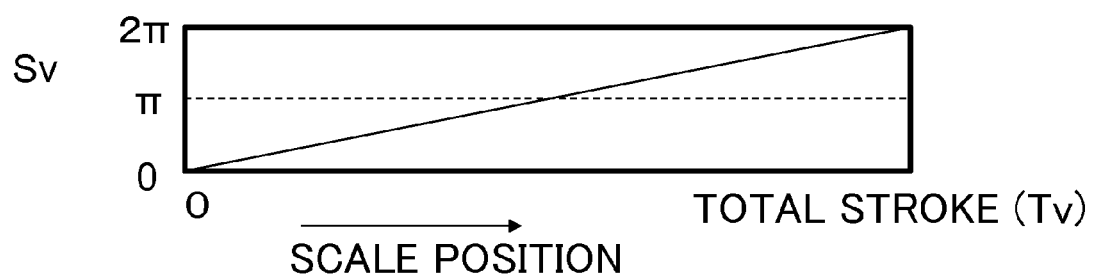
FIGS. 14A and 14B are diagrams of illustrating a relationship between a detected signal and a scale position in Embodiment 2.
Figure 14B:
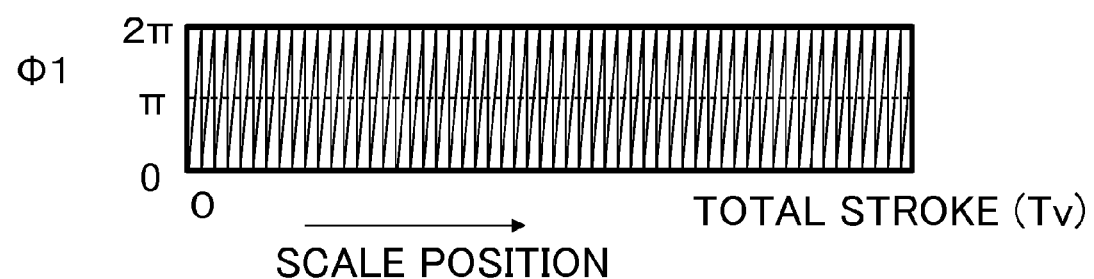

FIGS. 14A and 14B are diagrams of illustrating the relation between the detected signal and the scale position in the present embodiment, and FIG. 14A illustrates the relation between the vernier signal Sv and the scale position and FIG. 14B illustrates the relation between the phase signal Φ1 and the scale position. In the present embodiment, according to Expression (17), the period Tv of the vernier signal Sv is 21.12 mm and this is a detectable range. In the present embodiment, the phase signal Φ1 is used as a relative position signal (an incremental signal) that represents the relative position of the scale 20, and the vernier signal Sv is used as an absolute position signal that represents the absolute position of the scale 20.

According to the present embodiment, in addition to the effect of Embodiment 1, an encoder and a scale capable of obtaining the absolute position signal can be provided without increasing the size of a sensor unit.

Embodiment 3

Figure 15:
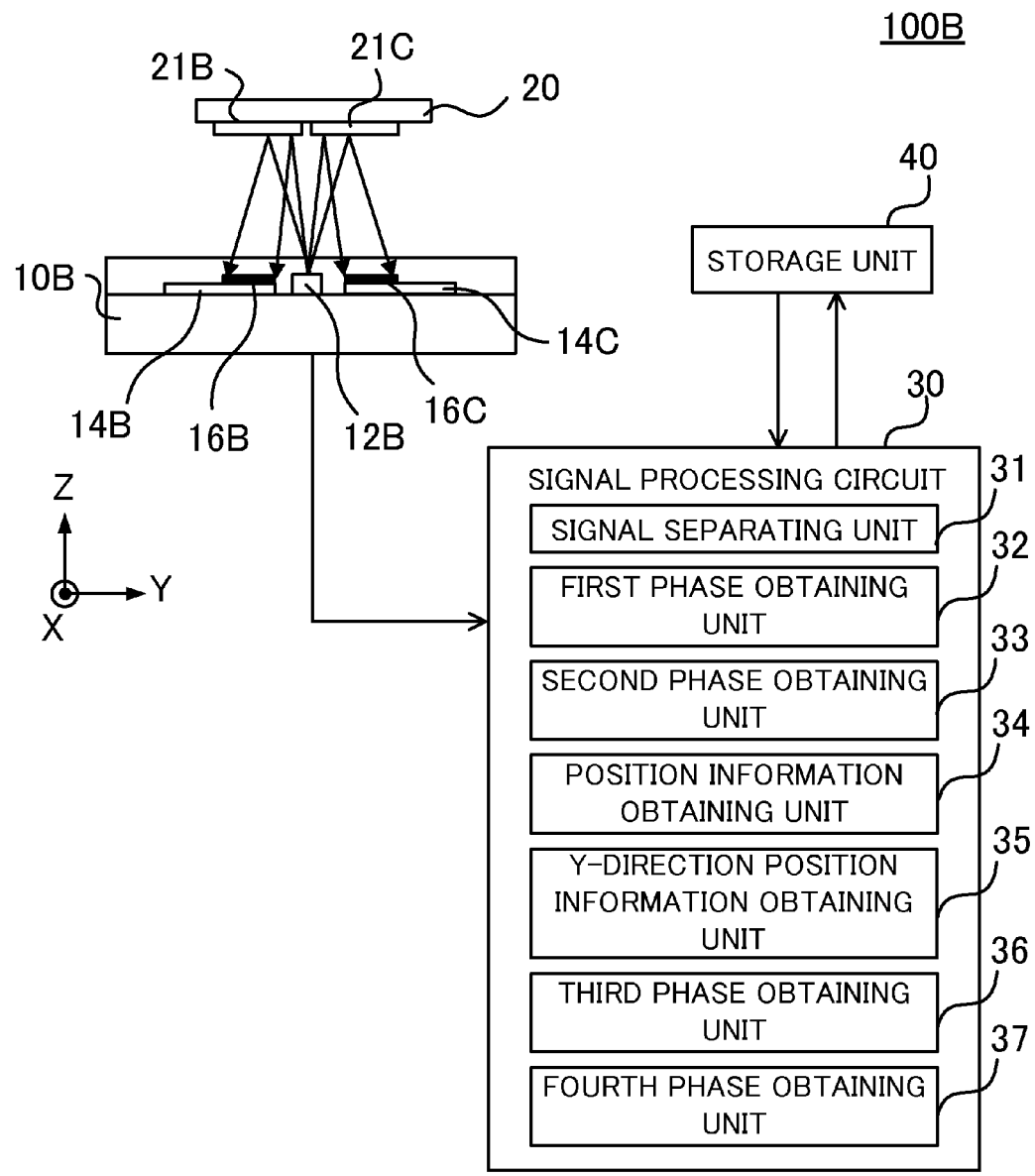
FIG. 15 is a schematic configuration diagram of an encoder in Embodiment 3.

Next, an encoder in Embodiment 3 of the present invention will be described. FIG. 15 is a schematic configuration diagram of an encoder 100B in the present embodiment. The encoder 100B is configured by including a sensor unit 10B that is attached to a fixed portion (not shown), a scale 20 that is attached to a movable portion (not shown), a signal processing circuit 30 (a signal processor), and a storage unit 40. The present embodiment is not limited to this, and if the sensor unit 10B and the scale 20 are configured to be relatively movable, conversely, the sensor unit 10B may be attached to the movable portion and the scale 20 may be attached to the fixed portion.

The sensor unit 10B is a sensor unit that is integrally configured by a light-receiving portion and a light-emitting portion, which mounts a light source 12B constituted by one LED, a light-receiving IC 14B having a light-receiving element array 16B, and a light-receiving IC 14C having a light-receiving element array 16C in the same package. The light-receiving element arrays 16B and 16C function as detection element arrays in which a plurality of detection elements (a plurality of light-receiving elements) that detect energy distributions from a pattern of the scale 20 are arrayed in an X direction that is a moving direction (a length measuring direction) of the scale 20 (or the movable portion). The signal processing circuit 30 of the present embodiment is the same as that of Embodiment 1 except that the output signals from the light-receiving element arrays 16B and 16C of the sensor unit 10B are converted into position information (absolute position information). The configuration of each of the light-receiving IC 14B and the light-receiving IC 14C is the same as that of light-receiving IC 14E in Embodiment 2.

In detecting the position information of the scale 20, a part of the divergent light beams emitted from the light source 12B provided in the sensor unit 10B is illuminated on the track 21B of the scale 20. Then, the light beam reflected by the track 21B is received by the light-receiving element array 16B of the sensor unit 10B. The other part of the divergent light beams emitted from the light source 12B is illuminated on the track 21C of the scale 20. Then, the light beam reflected by the track 21C is received by the light-receiving element array 16C of the sensor unit 10B. The light-receiving element arrays 16B and 16C receive images in which the reflectance distribution of each of the tracks 21B and 21C is doubled. Each of the light beams received by the light-receiving element arrays 16B and 16C is converted into an electric signal and is sent to the signal processing circuit 30 as an encoder signal. The signal processing circuit 30 converts each of the output signals from the light-receiving element arrays 16B and 16C into the position information, and thus the position information of the scale 20 is obtained and outputted with high accuracy.

Figure 16:
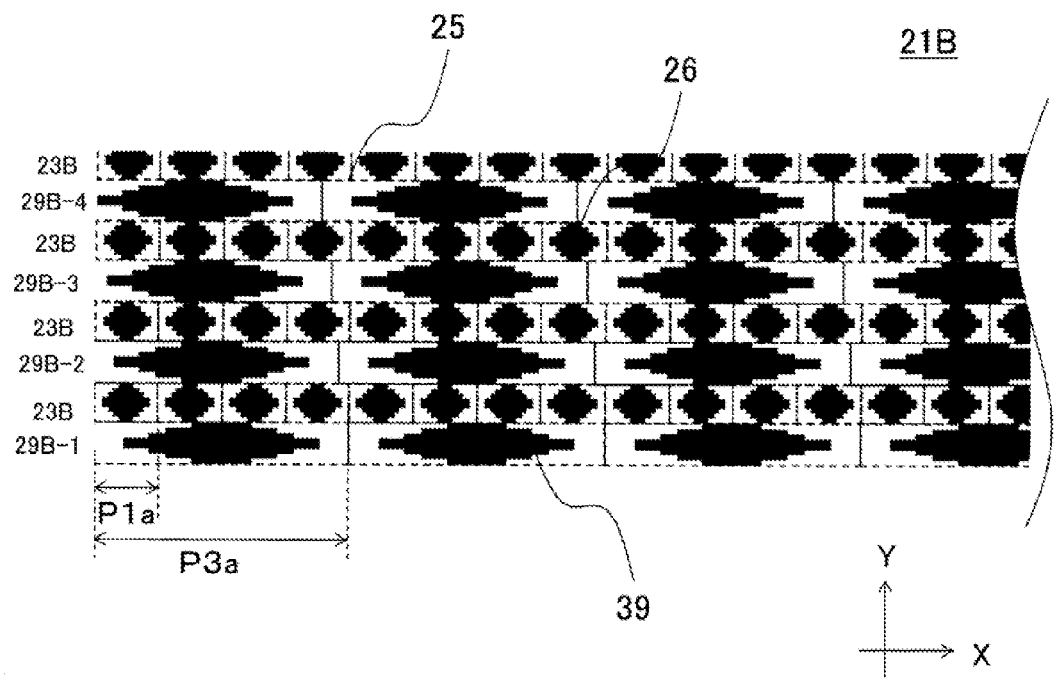
FIG. 16 is a partial plan view of a track in Embodiment 3.

Next, referring to FIG. 16, the configuration of the track 21B in the present embodiment will be described. FIG. 16 is a partial plan view of the track 21B. In the track 21B, two types of regions (a region 23B and a region 29B) are alternately (sequentially) arrayed in the direction (the Y direction) perpendicular to the moving direction (the X direction) of the scale 20. In the region 29B, a period of an (N+1)th region 29B-(N+1) is shifted by −10 μm in the X direction with reference to a period of an N-th region 29B-N in the Y direction.

The region 23B has the same configuration as that of the region 23 illustrated in FIG. 3, and has a pattern array in which the pattern of FIG. 3 is arranged with a pitch P1a (the second modulation period, which is 128 μm in the present embodiment) in the X direction. In the present embodiment, a width W1 of the region 23B in the Y direction is 75 μm. The width of the reflective portion 26 in the X direction is different in accordance with the position of the region 23B in the Y direction, similarly to Embodiment 2. The region 29B has the same configuration as that of the region 29 illustrated in FIG. 10, and has a pattern array in which the pattern of FIG. 10 is arranged with a pitch P3a (the first modulation period, which is 512 μm in the present embodiment) in the X direction. In the present embodiment, a width W1 of the region 29B in the Y direction is 75 μm. The width of the reflective portion 26 in the X direction is different in accordance with the position of the region 29B in the Y direction, similarly to Embodiment 2.

Figure 17:
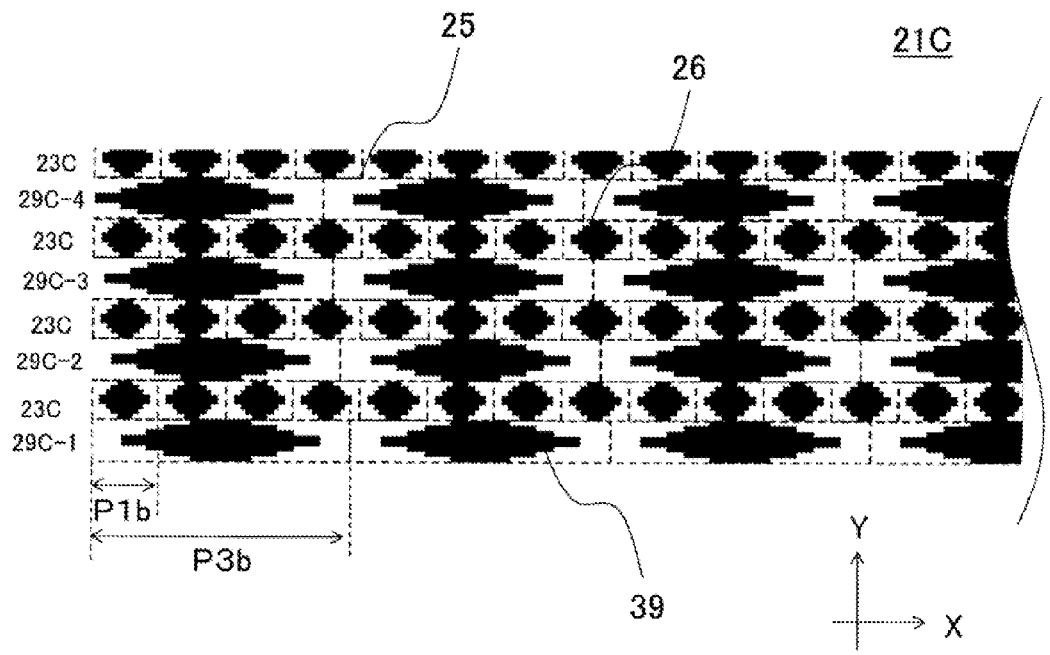
FIG. 17 is a partial plan view of a track in Embodiment 3.

Next, referring to FIG. 17, the configuration of the track 21C in the present embodiment will be described. FIG. 17 is a partial plan view of the track 21C. In the track 21C, two types of regions (a region 23C and a region 29C) are alternately (sequentially) arrayed in the direction (the Y direction) perpendicular to the moving direction (the X direction) of the scale 20. In the region 29C, a period of an (N+1)th region 29C-(N+1) is shifted by −10.1 μm in the X direction with reference to a period of an N-th region 29C-N in the Y direction.

The region 23C has the same configuration as that of the region 23 illustrated in FIG. 3, and has a pattern array in which the pattern of FIG. 3 is arranged with a pitch P1b (a fourth modulation period, which is 130.612245 μm in the present embodiment) in the X direction. In the present embodiment, a width W1 of the region 23C in the Y direction is 75 μm. The width of the reflective portion 26 in the X direction is different in accordance with the position of the region 23C in the Y direction, similarly to Embodiment 2. The region 29C has the same configuration as that of the region 29 illustrated in FIG. 10, and has a pattern array in which the pattern of FIG. 10 is arranged with a pitch P3b (a third modulation period, which is 517.171717 μm in the present embodiment) in the X direction. In the present embodiment, a width W3 of the region 29C in the Y direction is 75 μm. The width of the reflective portion 39 in the X direction is different in accordance with the position of the region 29C in the Y direction, similarly to Embodiment 2.

The second phase obtaining unit 33 of the signal processing circuit 30 obtains a phase signal $\Phi1a$ (the second phase) of the energy distribution of the region 23B of the track 21B based on S(A) and S(B) obtained from the light-receiving element array 16B when the input to the switch circuit 18 is at the high level. The phase signal $\Phi1a$ is obtained by the calculation represented by the following Expression (18). In Expression (18), symbol A TAN 2[Y, X] is an arctangent function that determines a quadrant so as to be converted into a phase of 0 to $2\pi$.

$$\Phi1a = A\ TAN\ 2[S(A), S(B)] \tag{18}$$

Similarly, the first phase obtaining unit 32 of the signal processing circuit 30 obtains a phase signal $\Phi3a$ (the first phase) of the energy distribution of the region 29B based on S(A) and S(B) obtained from the light-receiving element array 16B when the input to the switch circuit 18 is at the low level. The phase signal $\Phi3a$ is obtained by the calculation represented by the following Expression (19).

$$\Phi3a = A\ TAN\ 2[S(A), S(B)] \tag{19}$$

The fourth phase obtaining unit 37 of the signal processing circuit 30 obtains a phase signal $\Phi1b$ (the fourth phase) of the energy distribution of the region 23C based on S(A) and S(B) obtained from the light-receiving element array 16C when the input to the switch circuit 18 is at the high level. The phase signal $\Phi1b$ is obtained by the calculation represented by the following Expression (20).

$$\Phi1b = A\ TAN\ 2[S(A), S(B)] \tag{20}$$

Similarly, the third phase obtaining unit 36 of the signal processing circuit 30 obtains a phase signal Φ3b (the third phase) of the energy distribution of the region 29C based on S(A) and S(B) obtained from the light-receiving element array 16C when the input to the switch circuit 18 is at the low level. The phase signal Φ3b is obtained by the calculation represented by the following Expression (21).

$$\Phi 3b = A\ \text{TAN}\ 2[S(A),S(B)] \quad (21)$$

Obtaining the signal without any time difference (with a small time difference) before and after switching the input to the switch circuit 18, the phase signals Φ1a, Φ3a, Φ1b, and Φ3b at the same position (at substantially the same position) can be obtained.

Next, a method of detecting a displacement of a relative position between the sensor unit 10B and the scale 20 in the direction (the Y direction in the drawing) perpendicular to the position detecting direction (the X direction in the drawing) will be described. The Y-direction position information obtaining unit 35 of the signal processing circuit 30 obtains the signal Sy (the position signal) by the calculation represented by the following Expression (22).

$$Sy = \Phi 1a - 4 \cdot \Phi 3a \quad (22)$$

The signal processing circuit 30 repeats the calculation of Sy=Sy+2π when Sy<−π is satisfied and repeats the calculation of Sy=Sy−2π when Sy>+π is satisfied so as to convert the signal Sy into an output range between −π and +π. Monitoring the value of the obtained signal Sy, a displacement and its direction of a scan line of the sensor (the sensor unit 10B) can be easily detected.

The position information obtaining unit 34 of the present embodiment generates a vernier signal described below so as to obtain absolute position information of the scale 20. Subsequently, a flow of the process of performing absolute position detection will be described. The phase signals Φa and Φb are obtained by the calculations represented by the following Expressions (23) and (24), respectively.

$$\Phi a = \Phi 3a - \Phi 3b \quad (23)$$

$$\Phi b = \Phi 1a - \Phi 1b \quad (24)$$

The signal processing circuit 30 repeats the calculation of Φa=Φa+2π when Φa<0 is satisfied and repeats the calculation of Φa=Φa−2π when Φa>2π is satisfied so as to convert the phase signal Φa into an output range between 0 and 2π. The same is true for the phase signal Φb.

The phase signals Φ3a and Φ3b can be approximated for the positions x and y so as to be represented by the following Expressions (25) and (26), respectively.

$$\Phi 3a \approx 2\pi \times (x/P3a) + 2\pi \times (y/P3a) \times (10/150) + C3a \quad (25)$$

$$\Phi 3b \approx 2\pi \times (x/P3b) + 2\pi \times (y/P3b) \times (10.1/150) + C3b \quad (26)$$

In Expressions (25) and (26), each of symbols C3a and C3b denotes a predetermined constant. Using Expressions (25) and (26), the result of Expression (24) is represented as the following Expression (27).

$$\Phi b \approx 2\pi \times (x/P3a - x/P3b) + (C3a - C3b) \quad (27)$$

In other words, although the phase signal Φ3a is shifted in accordance with the position in the Y direction, the phase signal Φ3b is also shifted by the same amount (substantially the same amount) and therefore the phase signal Φa that is the difference of the phase signals does not vary in accordance with the position in the Y direction (substantially does not vary).

Signal periods Ta and Tb of the phase signals Φa and Φb in the X direction are Ta=51200 [μm] and Tb=6400 [μm].

Figure 18A:
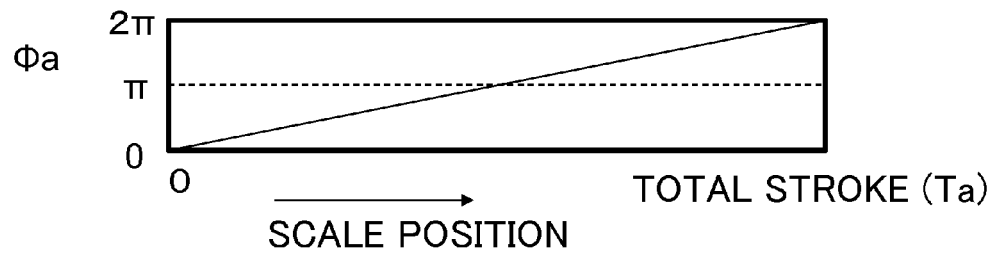
FIGS. 18A and 18B are diagrams of illustrating a relationship between a detected signal and a scale position in Embodiment 3.
Figure 18B:
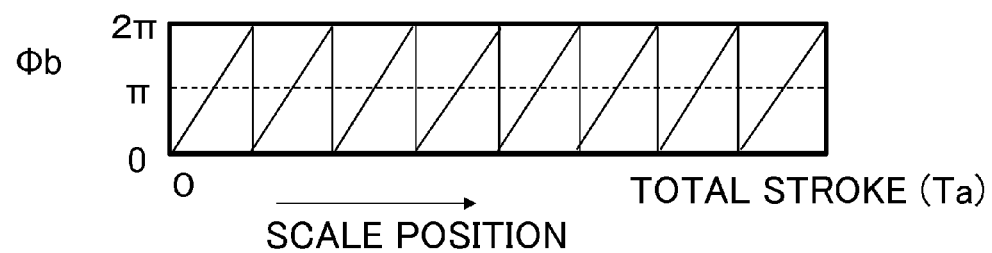

FIGS. 18A and 18B are diagrams of illustrating the relation between the detected signal and the scale position in the present embodiment, and FIG. 18A illustrates the phase signal Φa and the scale position and FIG. 18B illustrates the relation between the phase signal Φb and the scale position.

Next, a process of obtaining the absolute position information will be described. The signal processing circuit 30 synchronizes the phase signal Φa that is an upper-level signal and the phase signal Φb, and calculates the number of the periods of the phase signal Φb based on the phase signal Φa. Then, the signal processing circuit 30 connects the phase signal Φb so as to obtain an absolute position signal ABS having a position accuracy of the phase signal Φb as represented by the following Expression (28).

$$ABS = (2\pi \cdot \text{ROUND}[((Ta/Tb \cdot \Phi a - \Phi b)/(2\pi)] + \Phi b) \cdot Tb/(2\pi)\ [\mu m] \quad (28)$$

In Expression (28), symbol ROUND[x] denotes a function of converting x into an integer which is closest to x. Performing the combining process, a higher-accuracy absolute position can be detected.

In the present embodiment, the signal processing circuit 30 includes the third phase obtaining unit 36 that obtains the third phase from the third pattern and the fourth phase obtaining unit 37 that obtains the fourth phase from the fourth pattern. Then, the position information obtaining unit 34 obtains the absolute position information in the moving direction based on the first phase, the second phase, the third phase, and the fourth phase. According to the present embodiment, in addition to the effect of Embodiment 1, an encoder and a scale capable of obtaining an absolute position signal with a long stroke can be provided.

Embodiment 4

Next, an encoder in Embodiment 4 of the present invention will be described. The present embodiment is different from Embodiment 2 in that a light-receiving IC 14F having a light-receiving element array 16F is used, instead of the light-receiving IC 14E having the light-receiving element array 16E. Other configurations are the same as those in Embodiment 2.

Figure 19:
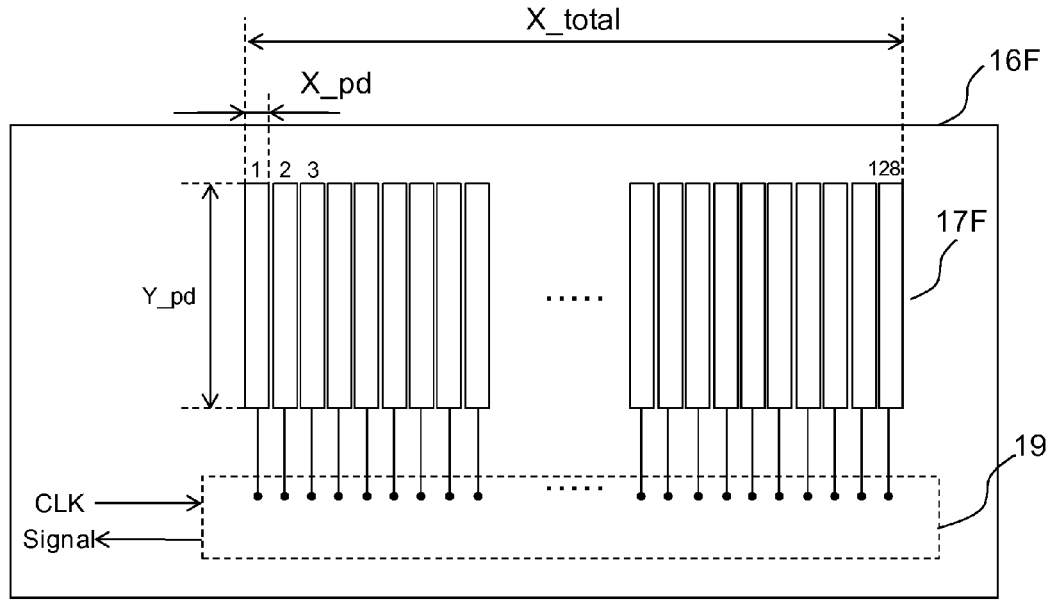
FIG. 19 is a plan view of a light-receiving surface of a light-receiving element array in Embodiment 4.

Referring to FIG. 19, a configuration of the light-receiving element array 16F in the present embodiment will be described. FIG. 19 is a plan view of a light-receiving surface of the light-receiving element array 16F. The light-receiving element array 16F is a linear sensor capable of sequentially obtaining an output according to a light-receiving amount of each light-receiving element (an output signal of each of a plurality of detection elements) in synchronization with a clock timing. The light-receiving element array 16F includes 128 light-receiving elements 17F arrayed with a pitch of 16 μm in the X direction. A width Y_pd in the Y direction is 900 μm, and a total width X_total in the X direction is 2048 μm. Since the pattern on the scale 20 is doubled to be projected, a detection range on the scale 20 is a range of 450 μm in the Y direction and 1024 μm in the X direction. Therefore, the detection range on the scale 20 includes three lines of each of the regions 23, 24, and 29 in the Y direction.

As a method of separating each of periodic signal components of the regions 23, 24, and 29 from a linear image signal V outputted from the output portion 19 of the light-receiving element array 16F, similarly to Embodiment 2, the signal may be converted into four-phase sine waves each of which corresponds to each period. In this case, the light-receiving element array 16F adds outputs of the two adjacent light-receiving elements and the added output replaces with the output of the light-receiving element in Embodiment 2, and thus the similar calculation can be performed. In this case, the signal processing circuit 30 performs a weighting appropriately in accordance with a position of each light-receiving element. Thus, in the present embodiment, a weighting unit is provided in the signal processing circuit 30.

In the present embodiment, a phase signal corresponding to the region 23 (with a period of 128 μm) is denoted as Φ1, a phase signal corresponding to the region 24 (with a period of 257.560976 μm) is denoted as Φ2, and a phase signal corresponding to the region 29 (with a period of 512 μm) is denoted as Φ3. Initial phases of three periodic patterns on the scale 20 are set so as to satisfy Φ1=Φ2=Φ3=0 at one end (X=0 mm) within the moving range.

As a method of separating each of the periodic signal components of the regions 23, 24, and 29 from the linear image signal detected by the light-receiving element array 16F, a Fourier transform may also be used. Subsequently, a process of the signal processing circuit 30 in performing the Fourier transform will be described.

First of all, an average of the output of 128 light-receiving elements 17F as a direct-current component is subtracted from an output of each light-receiving element. Furthermore, the light-receiving element array 16F are separated into two regions that are a region of 64 light-receiving elements around the center (a center portion) and a region of a total of 64 light-receiving elements which is constituted by each of 32 light-receiving elements from both ends (a peripheral portion). Coefficients different from each other are multiplied by each of the outputs of the center portion and the peripheral portion and the weighting is performed, and then the Fourier transform is performed for the 128 data. The phase signals Φ1, Φ2, and Φ3 are calculated based on the phase obtained by the Fourier transform and its corresponding spatial frequency.

Since the frequency resolution of the Fourier transform is $\Delta f=1/1024(\mu m^{-1})$ as a spatial frequency on the light-receiving surface, it is not exactly the same as a reflected image of the pattern of the region 24. The phase signal Φ1 as a component of $\Delta f \cdot 8=1/256(\mu m^{-1})$, the phase signal Φ2 as a component of $\Delta f \cdot 4=1/512(\mu m^{-1})$, and the phase signal Φ3 as a component of $\Delta f \cdot 2=1/1024(\mu m^{-1})$ are used for the subsequent calculation. In the present embodiment, the weighting is performed for each region by the calculation processing by the signal processing circuit 30, but alternatively, the output of each light-receiving element may have an electric gain different in accordance with the region. The method of performing the calculation to detect positions in a measuring direction and a direction perpendicular to the measuring direction is similar to that of Embodiment 2, and therefore descriptions of the method will be omitted.

According to the present embodiment, since an output of each detection element can be picked up using a linear sensor array, the operation to pick up a signal requires only once and a temporal synchronization between each signal phase is improved.

Embodiment 5

Figure 20:
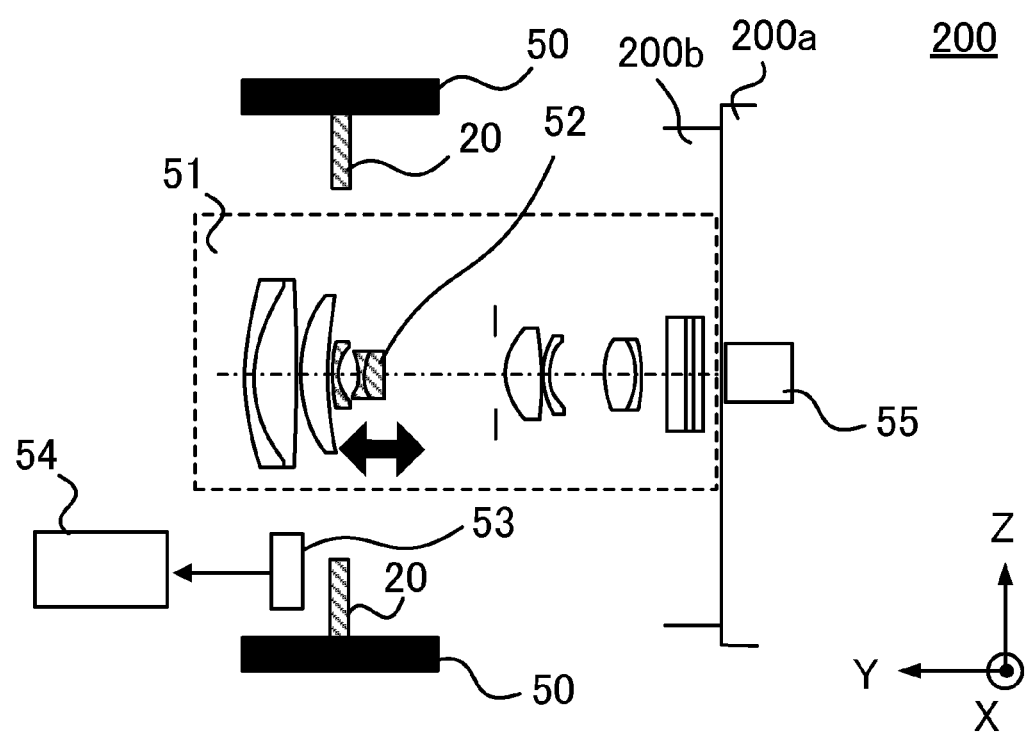
FIG. 20 is a schematic diagram of a cross section of an image pickup system in Embodiment 5.

Next, referring to FIG. 20, Embodiment 5 of the present invention will be described. FIG. 20 is a schematic diagram of a cross section of an image pickup system 200 in the present embodiment. The image pickup system 200 is an image pickup system which mounts the encoder in each of the embodiments described above on a lens apparatus. The image pickup system 200 is configured by including an image pickup apparatus 200a and a lens apparatus 200b (a lens barrel including the encoder) attachable to and removable from the image pickup apparatus 200a. However, the present embodiment can also be applied to an image pickup system which is integrally configured by the image pickup apparatus and the lens apparatus.

In FIG. 20, reference numeral 53 denotes a sensor unit, and reference numeral 54 denotes a CPU. The encoder is configured by the sensor unit 53 and the CPU 54 (and the scale 20). The sensor unit 53, for example, has a function of the sensor unit 10A in Embodiment 1, and the CPU 54 has a function of the signal processing circuit 30. Reference numeral 51 denotes a lens unit, reference numeral 52 denotes a drive lens, reference numeral 55 denotes an image pickup element, and reference numeral 50 denotes a cylindrical body, which mainly constitute an image pickup system. The drive lens 52 (a lens) that constitutes the lens unit 51 is for example an autofocus lens, which can be shifted in a Y direction that is an optical axis direction. The drive lens 52 may also be other lenses such as a zoom lens if it is a lens to be driven. The cylindrical body 50 in the present embodiment is coupled to an actuator (not shown) that drives the drive lens 52. The image pickup element 55 is provided on the image pickup apparatus 200a, which performs a photoelectric conversion for an optical image (an object image) obtained via the lens unit 51 (a lens).

A lens apparatus 200b of the present embodiment includes the drive lens 52 capable of displacing in the optical axis direction (the Y direction) and the encoder 100 configured so as to detect a displacement of the drive lens 52. The scale is attached to the cylindrical body 50. In this configuration, the encoder 100 obtains a rotation amount (a displacement) of the cylindrical body 50 around the optical axis direction so as to detect the displacement of the drive lens 52 in the optical axis direction.

The scale 20 may also be a rotary scale that is configured by forming a radial pattern formed on an annular disk surface (a doughnut-shaped surface) as a first pattern and a second pattern (and a third pattern). In this case, in this configuration, the scale 20 is attached to the cylindrical body 50. Alternatively, the scale 20 may be a linear scale that is configured by forming a grating pattern on a film base material. In this case, the scale 20 is attached to a cylindrical surface along a rotating direction of the cylindrical body 50.

When the cylindrical body 50 is rotated around the optical axis by the actuator or manually, the scale 20 is relatively displaced with respect to the sensor unit 53. In accordance with the displacement of the scale 20, the drive lens 52 is driven in the Y direction that is the optical axis direction (an arrow direction). A signal depending on the displacement of the drive lens 52 obtained from the sensor unit 53 of the encoder is outputted to the CPU 54. The CPU 54 generates a drive signal to move the drive lens 52 to a desired position. The drive lens 52 is driven based on the drive signal.

According to each of the embodiments described above, small-size and low-cost scale and encoder capable of detecting a relative position between a scale and a detector in a direction perpendicular to a moving direction with high accuracy can be provided. A lens apparatus and an image pickup system which use the encoder can also be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-190833, filed on Aug. 31, 2012, which is hereby incorporated by reference herein in its entirety.

What is claimed is:

1. A scale having a plurality of patterns so as to spatially modulate energy distributions, the plurality of patterns comprising:
   a first pattern having a first modulation period in a moving direction; and
   a second pattern having a second modulation period different from the first modulation period in the moving direction,
   wherein the first pattern has a plurality of first pattern lines arranged in a direction perpendicular to the moving direction, each first pattern line including a plurality of reflective portions arranged in the moving direction,
   wherein the second pattern has a plurality of second pattern lines arranged in the direction perpendicular to the moving direction, each second pattern line including a plurality of reflective portions arranged in the moving direction,
   wherein the plurality of first pattern lines and the plurality of second pattern lines are alternately arranged in the direction perpendicular to the moving direction,
   wherein a first relative position in the moving direction and a second relative position in the moving direction are different from each other, the first relative position being between one of the plurality of first pattern lines and one of the plurality of second pattern lines and the second relative position being between another of the plurality of first pattern lines and another of the plurality of second pattern lines, and
   wherein the plurality of reflective portions of each of the plurality of second pattern lines have different relative positions in the moving direction in relation to the plurality of reflective portions of any other of the plurality of second pattern lines.

2. The scale according to claim 1, wherein:
   the first pattern is in a first region,
   the second pattern is in each of a plurality of second regions, and
   the first region is adjacent to each of the plurality of second regions so as to be arranged between the plurality of second regions in the direction perpendicular to the moving direction.

3. The scale according to claim 1, wherein the scale is a rotary scale that includes a radial pattern as the first pattern and the second pattern on an annular disk surface.

4. The scale according to claim 1, wherein the scale is a linear scale that includes a grating pattern as the first pattern and the second pattern on a film base material.

5. The scale according to claim 1, further comprising:
   a third pattern having a third modulation period different from each of the first modulation period and the second modulation period in the moving direction,
   wherein a relative phase between the third pattern and the second pattern changes in accordance with the direction perpendicular to the moving direction.

6. The scale according to claim 1, wherein:
   a relative phase between the first pattern and the second pattern changes in accordance with the direction perpendicular to the moving direction,
   each of the first pattern and the second pattern includes the reflective portions that reflect light and a non-reflective portion that does not reflect light, and
   a width of at least one of the reflective portions in the moving direction varies depending on a position along the direction perpendicular to the moving direction.

7. An encoder comprising:
   a scale having a plurality of patterns so as to spatially modulate energy distributions;
   a detector configured to be relatively movable with respect to the scale and having a plurality of detection elements that detect the energy distributions arrayed in a moving direction; and
   a signal processor configured to process an output signal of the detector so as to obtain position information,
   wherein the plurality of patterns include a first pattern having a first modulation period in the moving direction and a second pattern having a second modulation period different from the first modulation period in the moving direction,
   wherein the first pattern has a plurality of first pattern lines arranged in a direction perpendicular to the moving direction, each first pattern line including a plurality of reflective portions arranged in the moving direction,
   wherein the second pattern has a plurality of second pattern lines arranged in the direction perpendicular to the moving direction, each second pattern line including a plurality of reflective portions arranged in the moving direction,
   wherein the plurality of first pattern lines and the plurality of second pattern lines are alternately arranged in the direction perpendicular to the moving direction,
   wherein the plurality of reflective portions of each of the plurality of second pattern lines have different relative positions in the moving direction in relation to the plurality of reflective portions of any other of the plurality of second pattern lines,
   wherein a relative phase between the first pattern and the second pattern changes in accordance with the direction perpendicular to the moving direction,
   wherein each of the plurality of detection elements is configured to receive the energy distributions from both the first pattern and the second pattern, and
   wherein the signal processor includes a first phase obtaining unit that obtains a first phase based on the first pattern and a second phase obtaining unit that obtains a second phase based on the second pattern, and is configured to obtain a position signal that varies in the direction perpendicular to the moving direction based on the first phase and the second phase.

8. The encoder according to claim 7, wherein the signal processor calculates the position signal based on the following expression:

$$Sy = A \cdot \Phi 1 - B \cdot \Phi 2,$$

where Sy is the position signal, $\Phi 1$ is the first phase, $\Phi 2$ is the second phase, A and B are arbitrary coefficients that satisfy a relation of A/B=P1/P2 when the first modulation period is P1, and the second modulation period is P2.

9. The encoder according to claim 7, wherein a first region having the first pattern and a second region having the second pattern are alternately arranged in the direction perpendicular to the moving direction.

10. The encoder according to claim 7, wherein:
each of the first pattern and the second pattern includes the reflective portions that reflect light and a non-reflective portion that does not reflect light, and
a width of at least one of the reflective portions in the moving direction at a first position is different from the width at a second position different from the first position along the direction perpendicular to the moving direction.

11. The encoder according to claim 7, wherein:
the first pattern is in a first region,
the second pattern is in each of a plurality of second regions, and
the first region is adjacent to each of the plurality of second regions so as to be arranged between the plurality of second regions in the direction perpendicular to the moving direction.

12. The encoder according to claim 7, wherein the signal processor includes a signal separating unit that separates a first signal corresponding to the first pattern and a second signal corresponding to the second pattern.

13. The encoder according to claim 7, further comprising:
a weighting unit configured to perform a weighting depending on positions of the plurality of detection elements for output signals of the plurality of detection elements that detect the first pattern,
wherein the weighting unit is set so that a value obtained by performing the weighting is not more than a value obtained without performing the weighting within a predetermined range containing a spatial frequency corresponding to the second modulation period of a spatial frequency response of the first phase obtaining unit.

14. The encoder according to claim 7, wherein:
the scale includes a third pattern having a third modulation period different from each of the first modulation period and the second modulation period in the moving direction,
a relative phase between the third pattern and the second pattern changes in accordance with the direction perpendicular to the moving direction, and
the signal processor includes a third phase obtaining unit that obtains a third phase based on the third pattern, and is configured to obtain absolute position information based on the first phase and the third phase.

15. The encoder according to claim 7, wherein:
the scale further includes a third pattern having a third modulation period in the moving direction and a fourth pattern having a fourth modulation period different from the third modulation period in the moving direction,
a relative phase between the third pattern and the fourth pattern changes in accordance with the direction perpendicular to the moving direction, and
the signal processor includes a third phase obtaining unit that obtains a third phase based on the third pattern and a fourth phase obtaining unit that obtains a fourth phase based on the fourth pattern, and is configured to obtain absolute position information in the moving direction based on the first phase, the second phase, the third phase, and the fourth phase.

16. The encoder according to claim 7, wherein the detector includes a linear sensor array capable of sequentially obtaining each of output signals of the plurality of detection elements in synchronization with a clock timing.

17. A lens apparatus comprising:
a lens displaceable in an optical axis direction; and
an encoder configured to detect a displacement of the lens,
wherein the encoder comprises:
a scale having a plurality of patterns so as to spatially modulate energy distributions;
a detector configured to be relatively movable with respect to the scale and having a plurality of detection elements that detect the energy distributions arrayed in a moving direction; and
a signal processor configured to process an output signal of the detector so as to obtain position information,
wherein the plurality of patterns include a first pattern having a first modulation period in the moving direction and a second pattern having a second modulation period different from the first modulation period in the moving direction,
wherein the first pattern has a plurality of first pattern lines arranged in a direction perpendicular to the moving direction, each first pattern line including a plurality of reflective portions arranged in the moving direction,
wherein the second pattern has a plurality of second pattern lines arranged in the direction perpendicular to the moving direction, each second pattern line including a plurality of reflective portions arranged in the moving direction,
wherein the plurality of first pattern lines and the plurality of second pattern lines are alternately arranged in the direction perpendicular to the moving direction,
wherein the plurality of reflective portions of each of the plurality of second pattern lines have different relative positions in the moving direction in relation to the plurality of reflective portions of any other of the plurality of second pattern lines,
wherein a relative phase between the first pattern and the second pattern changes in accordance with the direction perpendicular to the moving direction,
wherein each of the plurality of detection elements is configured to receive the energy distributions from both the first pattern and the second pattern, and
wherein the signal processor includes a first phase obtaining unit that obtains a first phase based on the first pattern and a second phase obtaining unit that obtains a second phase based on the second pattern, and is configured to obtain a position signal that varies in the direction perpendicular to the moving direction based on the first phase and the second phase.

18. An image pickup system comprising:
a lens apparatus; and
an image pickup apparatus having an image pickup element configured to perform a photoelectric conversion for an optical image obtained via the lens apparatus,
wherein the lens apparatus comprises:
a lens displaceable in an optical axis direction; and
an encoder configured to detect a displacement of the lens, and
wherein the encoder comprises:
a scale having a plurality of patterns so as to spatially modulate energy distributions;
a detector configured to be relatively movable with respect to the scale and having a plurality of detection elements that detect the energy distributions arrayed in a moving direction; and a signal processor configured to process an output signal of the detector so as to obtain position information, wherein the plurality of patterns include a first pattern having a first modulation period in the moving direction and a second pattern having a second modulation period different from the first modulation period in the moving direction, wherein the first pattern has a plurality of first pattern lines arranged in a direction perpendicular to the moving direction, each first pattern line including a plurality of reflective portions arranged in the moving direction, wherein the second pattern has a plurality of second pattern lines arranged in the direction perpendicular to the moving direction, each second pattern line including a plurality of reflective portions arranged in the moving direction, wherein the plurality of first pattern lines and the plurality of second pattern lines are alternately arranged in the direction perpendicular to the moving direction, wherein the plurality of reflective portions of each of the plurality of second pattern lines have different relative positions in the moving direction in relation to the plurality of reflective portions of any other of the plurality of second pattern lines, wherein a relative phase between the first pattern and the second pattern changes in accordance with the direction perpendicular to the moving direction, wherein each of the plurality of detection elements is configured to receive the energy distributions from both the first pattern and the second pattern, and wherein the signal processor includes a first phase obtaining unit that obtains a first phase based on the first pattern and a second phase obtaining unit that obtains a second phase based on the second pattern, and is configured to obtain a position signal that varies in the direction perpendicular to the moving direction based on the first phase and the second phase.

19. A scale having a plurality of patterns so as to spatially modulate energy distributions, the plurality of patterns comprising:

a first pattern having a first modulation period in a moving direction; and a second pattern having a second modulation period different from the first modulation period in the moving direction, wherein the first pattern has a plurality of first pattern lines arranged in a direction perpendicular to the moving direction, each first pattern line including a plurality of reflective portions arranged in the moving direction, wherein the second pattern has a plurality of second pattern lines arranged in the direction perpendicular to the moving direction, each second pattern line including a plurality of reflective portions arranged in the moving direction, wherein the plurality of first pattern lines and the plurality of second pattern lines are alternately arranged in the direction perpendicular to the moving direction, and wherein a first relative position in the moving direction and a second relative position in the moving direction are different from each other, the first relative position being a position of a plurality of patterns included in one first pattern line in the plurality of first pattern lines with respect to a plurality of patterns included in one second pattern line in the plurality of second pattern lines, and the second relative position being a position of a plurality of pattern included in another first pattern line in the plurality of first pattern lines with respect to a plurality of patterns included in another second pattern line in the plurality of second pattern lines.

20. The scale according to claim 19, wherein:

a position of the plurality of patterns included in the one first pattern line and a position of the plurality of pattern included in the another first pattern line are the same in the moving direction, and a position of the plurality of patterns included in the one second pattern line and a position of the plurality of patterns included in the another second pattern line are different from each other in the moving direction.

21. The scale according to claim 19, wherein a width of each of the plurality of patterns included in each of the one first pattern line, the another first pattern line, the one second pattern line, and the another second pattern line changes in a direction perpendicular to the moving direction in accordance with a position in the moving direction.

22. An encoder comprising:

a scale having a plurality of patterns so as to spatially modulate energy distributions;

a detector configured to be relatively movable with respect to the scale and having a plurality of detection elements that detect the energy distributions arrayed in a moving direction; and a signal processor configured to process an output signal of the detector so as to obtain position information, wherein the plurality of patterns include a first pattern having a first modulation period in the moving direction and a second pattern having a second modulation period different from the first modulation period in the moving direction, wherein the first pattern has a plurality of first pattern lines arranged in a direction perpendicular to the moving direction, each first pattern line including a plurality of reflective portions arranged in the moving direction, wherein the second pattern has a plurality of second pattern lines arranged in the direction perpendicular to the moving direction, each second pattern line including a plurality of reflective portions arranged in the moving direction, wherein the plurality of first pattern lines and the plurality of second pattern lines are alternately arranged in the direction perpendicular to the moving direction, wherein a first relative position in the moving direction and a second relative position in the moving direction are different from each other, the first relative position being a position of a plurality of patterns included in one first pattern line in the plurality of first pattern lines with respect to a plurality of patterns included in one second pattern line in the plurality of second pattern lines, and the second relative position being a position of a plurality of pattern included in another first pattern line in the plurality of first pattern lines with respect to a plurality of patterns included in another second pattern line in the plurality of second pattern lines, wherein a relative phase between the first pattern and the second pattern changes in accordance with the direction perpendicular to the moving direction, wherein each of the plurality of detection elements is configured to receive the energy distributions from both the first pattern and the second pattern, and wherein the signal processor includes a first phase obtaining unit that obtains a first phase based on the first pattern and a second phase obtaining unit that obtains a second phase based on the second pattern, and is configured to obtain a position signal that varies in the direction perpendicular to the moving direction based on the first phase and the second phase.

23. A lens apparatus comprising:
a lens displaceable in an optical axis direction; and
an encoder configured to detect a displacement of the lens,
wherein the encoder comprises:
- a scale having a plurality of patterns so as to spatially modulate energy distributions;
- a detector configured to be relatively movable with respect to the scale and having a plurality of detection elements that detect the energy distributions arrayed in a moving direction; and
- a signal processor configured to process an output signal of the detector so as to obtain position information,
wherein the plurality of patterns include a first pattern having a first modulation period in the moving direction and a second pattern having a second modulation period different from the first modulation period in the moving direction,
wherein the first pattern has a plurality of first pattern lines arranged in a direction perpendicular to the moving direction, each first pattern line including a plurality of reflective portions arranged in the moving direction,
wherein the second pattern has a plurality of second pattern lines arranged in the direction perpendicular to the moving direction, each second pattern line including a plurality of reflective portions arranged in the moving direction,
wherein the plurality of first pattern lines and the plurality of second pattern lines are alternately arranged in the direction perpendicular to the moving direction,
wherein a first relative position in the moving direction and a second relative position in the moving direction are different from each other, the first relative position being a position of a plurality of patterns included in one first pattern line in the plurality of first pattern lines with respect to a plurality of patterns included in one second pattern line in the plurality of second pattern lines, and the second relative position being a position of a plurality of pattern included in another first pattern line in the plurality of first pattern lines with respect to a plurality of patterns included in another second pattern line in the plurality of second pattern lines,
wherein a relative phase between the first pattern and the second pattern changes in accordance with the direction perpendicular to the moving direction,
wherein each of the plurality of detection elements is configured to receive the energy distributions from both the first pattern and the second pattern, and
wherein the signal processor includes a first phase obtaining unit that obtains a first phase based on the first pattern and a second phase obtaining unit that obtains a second phase based on the second pattern, and is configured to obtain a position signal that varies in the direction perpendicular to the moving direction based on the first phase and the second phase.

24. An image pickup system comprising:
a lens apparatus; and
an image pickup apparatus having an image pickup element configured to perform a photoelectric conversion for an optical image obtained via the lens apparatus,
wherein the lens apparatus comprises:
a lens displaceable in an optical axis direction; and
an encoder configured to detect a displacement of the lens,
wherein the encoder comprises:
- a scale having a plurality of patterns so as to spatially modulate energy distributions;
- a detector configured to be relatively movable with respect to the scale and having a plurality of detection elements that detect the energy distributions arrayed in a moving direction; and
- a signal processor configured to process an output signal of the detector so as to obtain position information,
wherein the plurality of patterns include a first pattern having a first modulation period in the moving direction and a second pattern having a second modulation period different from the first modulation period in the moving direction,
wherein the first pattern has a plurality of first pattern lines arranged in a direction perpendicular to the moving direction, each first pattern line including a plurality of reflective portions arranged in the moving direction,
wherein the second pattern has a plurality of second pattern lines arranged in the direction perpendicular to the moving direction, each second pattern line including a plurality of reflective portions arranged in the moving direction,
wherein the plurality of first pattern lines and the plurality of second pattern lines are alternately arranged in the direction perpendicular to the moving direction,
wherein a relative phase between the first pattern and the second pattern changes in accordance with the direction perpendicular to the moving direction,
wherein each of the plurality of detection elements is configured to receive the energy distributions from both the first pattern and the second pattern, and
wherein the signal processor includes a first phase obtaining unit that obtains a first phase based on the first pattern and a second phase obtaining unit that obtains a second phase based on the second pattern, and is configured to obtain a position signal that varies in the direction perpendicular to the moving direction based on the first phase and the second phase.

* * * * *